United States Patent
Mori et al.

(10) Patent No.: US 11,930,035 B2
(45) Date of Patent: Mar. 12, 2024

(54) COMMUNICATION CONTROL SYSTEM, INFORMATION PROCESSING APPARATUS, AND COMMUNICATION CONTROL METHOD

(71) Applicant: SHARP KABUSHIKI KAISHA, Sakai (JP)

(72) Inventors: Harunobu Mori, Sakai (JP); Kenji Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 309 days.

(21) Appl. No.: 17/462,890

(22) Filed: Aug. 31, 2021

(65) Prior Publication Data

US 2022/0078204 A1 Mar. 10, 2022

(30) Foreign Application Priority Data

Sep. 8, 2020 (JP) .................................. 2020-150382

(51) Int. Cl.
*H04L 9/40* (2022.01)
*G06F 21/60* (2013.01)

(52) U.S. Cl.
CPC ........ *H04L 63/1441* (2013.01); *G06F 21/608* (2013.01); *H04L 63/1416* (2013.01)

(58) Field of Classification Search
CPC ............... H04L 63/1441; H04L 63/141; H04L 63/1433; G06F 21/608
See application file for complete search history.

(56) References Cited

U.S. PATENT DOCUMENTS

| | | | |
|---|---|---|---|
| 8,117,654 B2 * | 2/2012 | Jung | H04L 63/1408 713/188 |
| 2002/0194495 A1 * | 12/2002 | Gladstone | H04L 63/0254 726/22 |
| 2011/0032567 A1 * | 2/2011 | Ishida | G06F 21/566 358/1.15 |
| 2021/0044612 A1 | 2/2021 | Kawauchi et al. | |
| 2022/0155747 A1 * | 5/2022 | Hirobe | G06F 21/71 |

FOREIGN PATENT DOCUMENTS

| JP | 2005-193590 A | 7/2005 |
|---|---|---|
| JP | 2019-133599 A | 8/2019 |

* cited by examiner

*Primary Examiner* — Ali S Abyaneh
(74) *Attorney, Agent, or Firm* — ScienBiziP, P.C.

(57) ABSTRACT

An information processing apparatus detects an unauthorized attack and transmits attack detection information concerning the detected attack to a communication control device. The communication control device selects an attack countermeasure instruction associated with an attack detection content that matches the attack detection information and an attack countermeasure function of the information processing apparatus by using the transmitted attack detection information and the attack countermeasure information stored in advance, decides a countermeasure method to be executed against the attack, and transmits the attack countermeasure instruction information including the decided countermeasure method to the information processing apparatus. The information processing apparatus is characterized to decide the countermeasure method to be executed against the attack from the received attack countermeasure instruction information and to execute the decided countermeasure method against the attack.

9 Claims, 16 Drawing Sheets

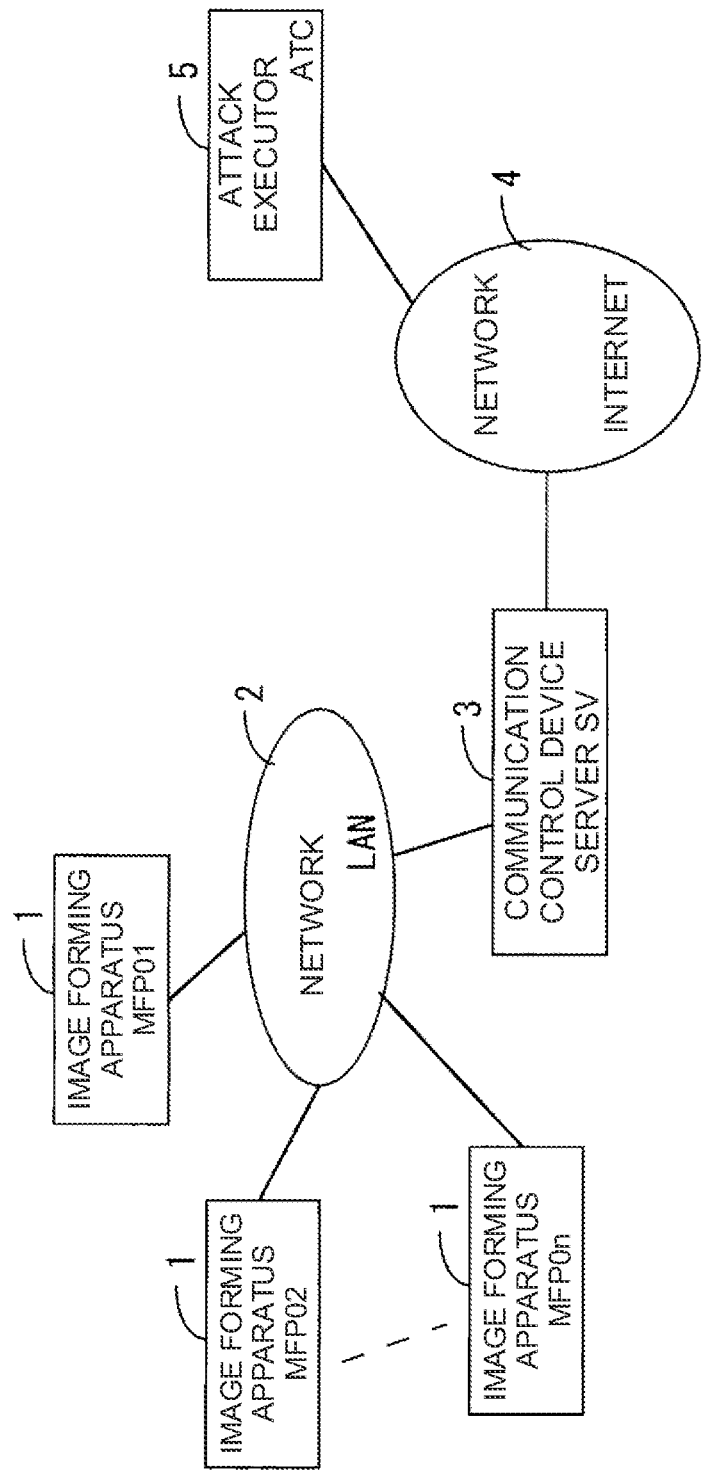

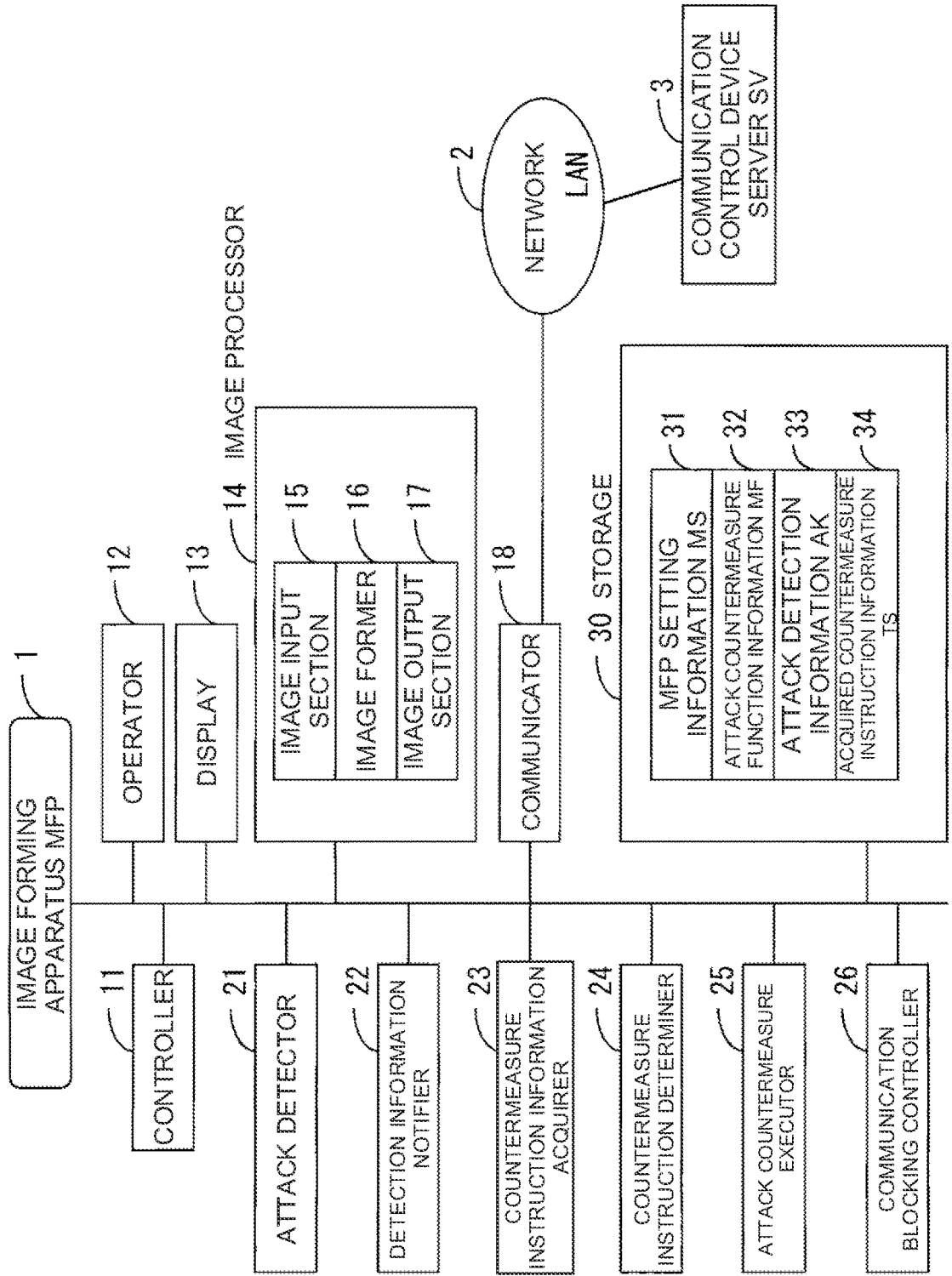

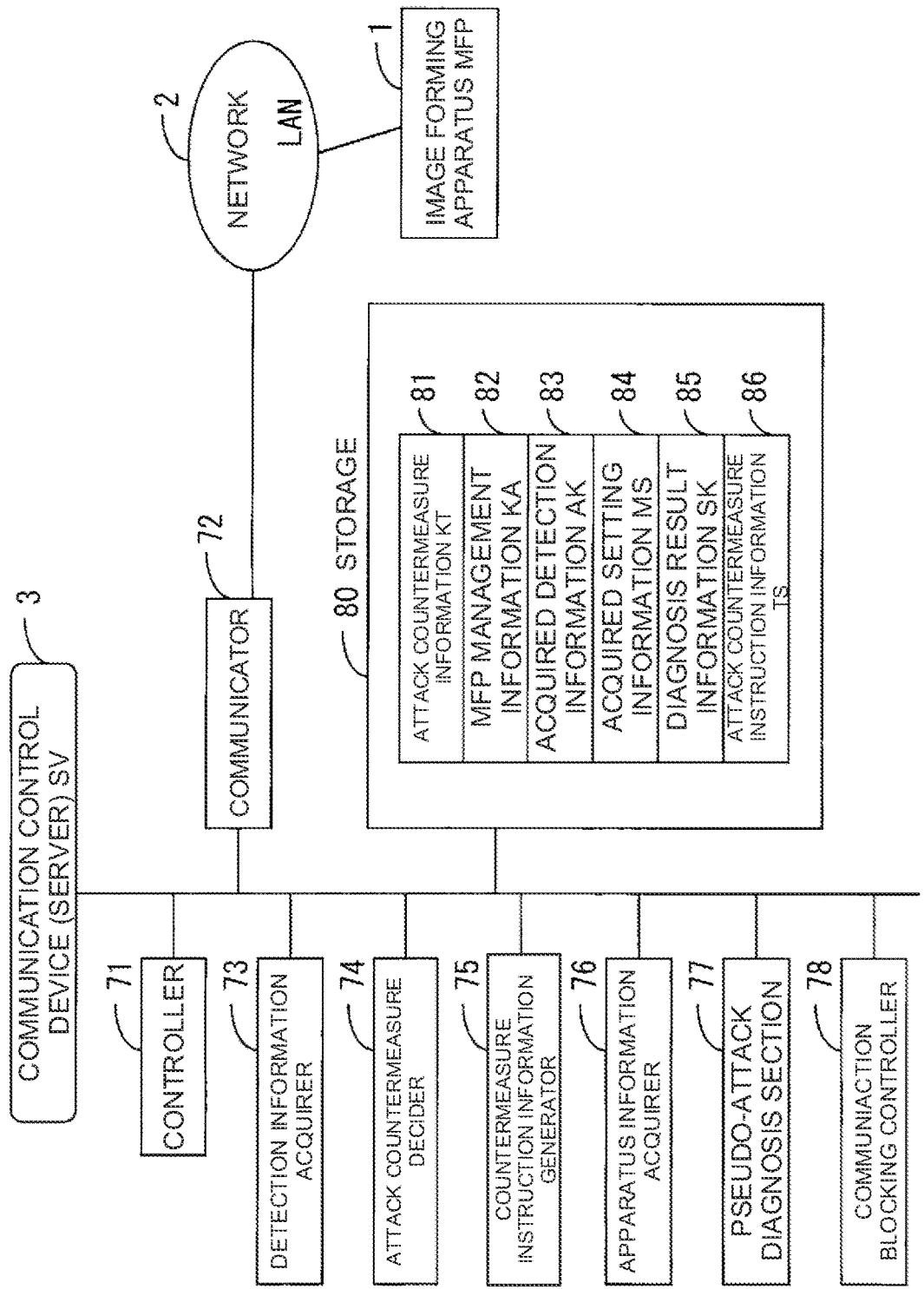

FIG. 4

ATTACK DETECTION INFORMATION AK
33 (TRANSMISSION MFP -> SV)

| | INFORMATION ITEM | DATA EXAMPLE | |
|---|---|---|---|
| 1 | MFP IDENTIFICATION INFORMATION | MFP MODEL NUMBER, MFP SERIAL NUMBER | (MFP01) |
| 2 | ATTACK CONTENT TYPE | UNAUTHORIZED LOGIN | |
| 3 | IP ADDRESS OF ATTACKER | 222. 333. 444. 555 | |
| 4 | PORT NUMBER OF ATTACKER | 455 | |
| 5 | IP ADDRESS OF ATTACK DESTINATION | 999. 888. 777. 666 | |
| 6 | PORT NUMBER OF ATTACK DESTINATION | 123 | |
| 7 | LOGIN NAME USED | loginname | |
| 8 | LOGIN PASSWORD USED | 123 | |

FIG. 5

31 MFP SETTING INFORMATION MS

| | SETTING ITEM | DATA EXAMPLE |
|---|---|---|
| 1 | PRINT FROM EXTERNAL NETWORK PERMITTED OR NOT | PRINT PERMITTED |
| 2 | PRINT FROM NETWORK PERMITTED OR NOT | PRINT NOT PERMITTED |

32 ATTACK COUNTERMEASURE FUNCTION INFORMATION MF

| | FUNCTION ITEM | DATA EXAMPLE | |
|---|---|---|---|
| 1 | LOGIN CONTROL FUNCTION FOR EACH SEGMENT | YES | (NO) |
| 2 | PROHIBITION FUNCTION OF LOGIN VIA NETWORK | YES | (NO) |
| 3 | PRINT CONTROL FUNCTION FOR EACH SEGMENT | YES | (NO) |
| 4 | PROHIBITION FUNCTION OF PRINT VIA NETWORK | YES | (NO) |
| 5 | LOGIN CONTROL FUNCTION FOR EACH IP ADDRESS | YES | (NO) |
| 6 | CONSOLIDATED PRINT CONTROL FUNCTION FOR EACH IP ADDRESS | YES | (NO) |
| 7 | LOGIN NAME DISABLE FUNCTION | YES | (NO) |

FIG. 6

82  MFP MANAGEMENT INFORMATION KA

| | INFORMATION ITEM | DATA EXAMPLE | |
|---|---|---|---|
| 1 | MFP IDENTIFICATION INFORMATION ID | MFP01 (MODEL NUMBER, SERIAL NUMBER) | MFP02 (MODEL NUMBER, SERIAL NUMBER) |
| 2 | IP ADDRESS IP | 222.333.444.555 | 999.888.777.666 |
| 3 | ATTACK COUNTERMEASURE FUNCTION MF | LOGIN CONTROL FUNCTION FOR EACH SEGMENT: YES | LOGIN CONTROL FUNCTION FOR EACH SEGMENT: YES |
| | | PRINT CONTROL FUNCTION FOR EACH SEGMENT: YES | PROHIBITION FUNCTION OF LOGIN VIA NETWORK: YES |
| | | PROHIBITION FUNCTION OF PRINT VIA NETWORK: NO | PRINT CONTROL FUNCTION FOR EACH SEGMENT: NO |
| 4 | MFP SETTING INFORMATION MS | PRINT FROM EXTERNAL SEGMENT PERMITTED OR NOT: PERMITTED | PRINT FROM EXTERNAL SEGMENT PERMITTED OR NOT: PERMITTED |
| | | PRINT VIA NETWORK PERMITTED OR NOT: PERMITTED | PRINT VIA NETWORK PERMITTED OR NOT: NOT PERMITTED |

85  DIAGNOSIS RESULT INFORMATION SK

| | DIAGNOSIS ITEM | DIAGNOSSIS RESULT EXAMPLE | |
|---|---|---|---|
| 1 | EXECUTE PSEUDO-LOGIN SIMILAR TO UNAUTHORIZED LOGIN | LOGIN NAME | user005 |
| | | PASSWORD | PASS005 |
| | | DIAGNOSIS RESULT | LOGIN SUCCEEDED |
| 2 | EXECUTE PSEUDO-LOGIN SIMILAR TO UNAUTHORIZED LOGIN | LOGIN NAME | user111 |
| | | PASSWORD | PASS111 |
| | | DIAGNOSIS RESULT | LOGIN FAILED |

FIG. 7

86 ATTACK COUNTERMEASURE INSTRUCTION INFORMATION TS (TRANSMISSION SV -> MFP)

| | INFORMATION ITEM | DATA EXAMPLE | |
|---|---|---|---|
| 1 | TRANSMISSION DESTINATION MFP IDENTIFICATION INFORMATION | MFP MODEL NUMBER, MFP SERIAL NUMBER | (MFP001) |
| 2 | ATTACK COUNTERMEASURE CONTENT TYPE | LOGIN PROHIBITED | |
| 3 | PROHIBITED IP ADDRESS | 222.333.444.555 | |
| 4 | PROHIBITED PORT NUMBER | 400 | |

86 ATTACK COUNTERMEASURE INSTRUCTION INFORMATION TS (TRANSMISSION SV -> MFP)

| | INFORMATION ITEM | DATA EXAMPLE | |
|---|---|---|---|
| 1 | TRANSMISSION DESTINATION MFP IDENTIFICATION INFORMATION | MFP MODEL NUMBER, MFP SERIAL NUMBER | (MFP001) |
| 2 | ATTACK COUNTERMEASURE CONTENT TYPE | DATA RECEPTION PROHIBITED | |
| 3 | DISCARDED IP ADDRESS RANGE | 222.333.444.XXX | |
| 4 | DISCARDED PORT NUMBER RANGE | 400-499 | |

86 ATTACK COUNTERMEASURE INSTRUCTION INFORMATION TS (TRANSMISSION SV -> MFP)

| | INFORMATION ITEM | DATA EXAMPLE | |
|---|---|---|---|
| 1 | TRANSMISSION DESTINATION MFP IDENTIFICATION INFORMATION | MFP MODEL NUMBER, MFP SERIAL NUMBER | (MFP001) |
| 2 | ATTACK COUNTERMEASURE CONTENT TYPE | LOGIN PROHIBITED | |
| 3 | DISABLED LOGIN NAME | log111 | |

FIG. 8

ATTACK COUNTERMEASURE INFORMATION KT

| | ATTACK DETECTION CONTENT KK (ATTACK DETECTION INFORMATION) | ATTACK COUNTERMEASURE FUNCTION MF (CONTROL FUNCTION FOR EACH MFP) | ATTACK COUNTERMEASURE INSTRUCTION TSH (MFP COUNTERMEASURE METHOD) | OPERATION OF MFP — EXECUTION CONTENT OF ATTACK COUNTERMEASURE |
|---|---|---|---|---|
| 1 | DETECTION OF UNAUTHORIZED LOGIN FROM EXTERNAL NETWORK KK01 | LOGIN CONTROL FUNCTION FOR EACH SEGMENT MF01 | SUSPENSION OF LOGIN FROM EXTERNAL NETWORK TS01 | PROHIBIT LOGIN FROM EXTERNAL NETWORK FOR CERTAIN PERIOD OF TIME CT01 |
| 2 | DETECTION OF UNAUTHORIZED LOGIN FROM EXTERNAL NETWORK KK01 | PROHIBITION OF LOGIN VIA NETWORK MF02 | SUSPENSION OF LOGIN VIA NETWORK TS02 | PROHIBIT LOGIN VIA NETWORK FOR CERTAIN PERIOD OF TIME CT02 |
| 3 | DETECTION OF UNAUTHORIZED LOGIN FROM INTERNAL NETWORK KK02 | LOGIN CONTROL FUNCTION FOR EACH SEGMENT MF01 | SUSPENSION OF LOGIN FROM INTERNAL NETWORK TS11 | PROHIBIT LOGIN FROM INTERNAL NETWORK FOR CERTAIN PERIOD OF TIME CT11 |
| 4 | DETECTION OF UNAUTHORIZED LOGIN FROM INTERNAL NETWORK KK02 | PROHIBITION OF LOGIN VIA NETWORK MF02 | SUSPENSION OF LOGIN VIA NETWORK TS12 | PROHIBIT LOGIN VIA NETWORK FOR CERTAIN PERIOD OF TIME CT12 |
| 5 | DETECTION OF UNAUTHORIZED PRINT FROM EXTERNAL NETWORK KK03 | PRINT CONTROL FUNCTION FOR EACH SEGMENT MF21 | SUSPENSION OF PRINT FROM EXTERNAL NETWORK TS21 | PROHIBIT PRINT FROM EXTERNAL NETWORK FOR CERTAIN PERIOD OF TIME CT21 |
| 6 | DETECTION OF UNAUTHORIZED PRINT FROM EXTERNAL NETWORK KK03 | PROHIBITION OF PRINT VIA NETWORK MF22 | SUSPENSION OF PRINT VIA NETWORK TS22 | PROHIBIT PRINT VIA NETWORK FOR CERTAIN PERIOD OF TIME CT22 |

FIG. 10

ATTACK COUNTERMEASURE INFORMATION KT

| | ATTACK DETECTION CONTENT KK (ATTACK DETECTION INFORMATION) | COUNTERMEASURE FUNCTION MF (CONTROL FUNCTION FOR EACH MFP) | ATTACK COUNTERMEASURE INSTRUCTION TSH (MFP COUNTERMEASURE METHOD) | OPERATION OF MFP |
|---|---|---|---|---|
| | | | | EXECUTION CONTENT OF ATTACK COUNTERMEASURE |
| 1 | DETECTION OF FIRMWARE FALSIFICATION KK31 | LOGIN CONTROL FUNCTION FOR EACH IP ADDRESS MF31 | STOP LOGIN FROM IP ADDRESS OF MFP01 TS31 | PROHIBIT LOGIN FROM IP ADDRESS OF MFP01 CT31 |
| 2 | DETECTION OF FIRMWARE FALSIFICATION KK31 | CONSOLIDATED PRINT CONTROL FUNCTION FOR EACH IP ADDRESS MF32 | STOP CONSOLIDATED PRINT FROM IP ADDRESS OF MFP01 TS32 | PROHIBIT CONSOLIDATED PRINT FROM IP ADDRESS OF MFP01 CT32 |
| 3 | DETECTION OF FIRMWARE FALSIFICATION KK31 | PACKET FILTERING FUNCTION MF3 | DISCARD TRANSMITTED PACKET FROM IP ADDRESS OF MFP01 TS33 | DISCARD PACKET TRANSMITTED FROM IP ADDRESS OF MFP01 CT33 |

FIG. 13

ATTACK COUNTERMEASURE INFORMATION KT

| | ATTACK DETECTION CONTENT KK (ATTACK DETECTION INFORMATION) | ATTACK COUNTERMEASURE FUNCTION MF (CONTROL FUNCTION FOR EACH MFP) | PSEUDO-ATTACK DIAGNOSIS SD (ATTACK CONTENT AND DIAGNOSIS RESULT) | ATTACK COUNTERMEASURE INSTRUCTION TSH (MFP COUNTERMEASURE METHOD) | OPERATION OF MFP |
|---|---|---|---|---|---|
| | | | | | EXECUTION CONTENT OF ATTACK COUNTERMEASURE CT |
| 1 | DETECTION OF UNAUTHORIZED LOGIN FROM EXTERNAL SEGMENT KK41 | DISABLING FUNCTION OF LOGIN NAME MF41 | PSEUDO-LOGIN SUCCEEDED WITH LOGIN NAME AND PASSWORD USED FOR UNAUTHORIZED LOGIN SD41 | DISABLE LOGIN NAME WHICH SUCCEEDED IN PSEUDO-LOGIN TS41 | PROHIBIT LOGIN USING LOGIN NAME WHICH SUCCEEDED IN PSEUDO-LOGIN FOR CERTAIN PERIOD OF TIME CT41 |
| 2 | DETECTION OF UNAUTHORIZED LOGIN FROM EXTERNAL SEGMENT KK41 | LOGIN CONTROL FUNCTION FOR EACH SEGMENT MF42 | PSEUDO-LOGIN SUCCEEDED WITH LOGIN NAME AND PASSWORD USED FOR UNAUTHORIZED LOGIN SD41 | SUSPENSION OF LOGIN FROM EXTERNAL SEGMENT TS42 | PROHIBIT LOGIN FROM EXTERNAL SEGMENT FOR CERTAIN PERIOD OF TIME CT42 |

FIG. 15

ATTACK COUNTERMEASURE INFORMATION KT

| | ATTACK DETECTION CONTENT KK (ATTACK DETECTION INFORMATION) | ATTACK COUNTERMEASURE FUNCTION MF (CONTROL FUNCTION FOR EACH MFP) | MFP SETTING INFORMATION SE (SETTING INFORMATION FOR EACH MFP) | ATTACK COUNTERMEASURE INSTRUCTION TSH (MFP COUNTERMEASURE METHOD) | OPERATION OF MFP |
|---|---|---|---|---|---|
| | | | | | EXECUTION CONTENT OF ATTACK COUNTERMEASURE CT |
| 1 | DETECTION OF UNAUTHORIZED PRINT FROM EXTERNAL SEGMENT KK51 | PRINT CONTROL FUNCTION FOR EACH SEGMENT MF51 | PRINT FROM EXTERNAL SEGMENT PERMITTED OR NOT: SHOULD BE "PRINT PERMITTED" SE51 | SUSPENSION OF PRINT FROM EXTERNAL SEGMENT TS51 | PROHIBIT PRINT FROM EXTERNAL SEGMENT FOR CERTAIN PERIOD OF TIME CT51 |
| 2 | DETECTION OF UNAUTHORIZED PRINT FROM EXTERNAL SEGMENT KK51 | PRINT CONTROL FUNCTION VIA NETWORK MF52 | PRINT VIA NETWORK PERMITTED OR NOT: SHOULD BE "PRINT PERMITTED" SE52 | SUSPENSION OF PRINT VIA NETWORK TS52 | PROHIBIT PRINT VIA NETWORK FOR CERTAIN PERIOD OF TIME CT52 |

COMMUNICATION CONTROL SYSTEM, INFORMATION PROCESSING APPARATUS, AND COMMUNICATION CONTROL METHOD

BACKGROUND OF THE INVENTION

Field of the Invention

This invention relates to a communication control system, an information processing apparatus, and a communication control method, and in particular to a communication control system, an information processing apparatus, and a communication control method, having a function of detecting unauthorized communication processing and the like and blocking the unauthorized communication.

DESCRIPTION OF THE BACKGROUND ART

Conventionally, many information processing apparatuses such as personal computers, mobile terminals, and image forming apparatuses have functions to connect to networks such as the Internet and LAN.
Some have an intrusion detection function that detects unauthorized attacks (access) via the network, prevents intrusion of computer viruses and the like, and prevents unauthorized transmission of unauthorized packets containing confidential information to the network.
Furthermore, various systems and software, such as intrusion detection systems (IDS) and unauthorized prevention systems (IPS), are used to detect unauthorized attacks and prevent intrusions.

In the intrusion detection system, for example, pattern files and disinfection programs corresponding to known computer viruses and the like are stored in advance, and computer viruses and the like that match the pattern files are detected, and the computer viruses and the like are deleted or quarantined by the disinfection programs.
Furthermore, when an unauthorized access via the network is detected but the countermeasure against the unauthorized access is unknown, all communication via the network is also blocked.

In Japanese Unexamined Patent Application Publication No. 2005-193590, such a printing device is described that, when an attack via the network is detected by using an attack detection algorithm such as port scan detection or the like, the IP address of the attacker is added to the communication prohibited address book, communication with the IP address of the attacker is blocked, and the IP address of the attacker is notified to another printing apparatus.

However, not all information processing apparatuses connected to a network have the similar unauthorized access detection function and communication blocking function, and some apparatuses can sufficiently deal with attacks via the network, while others cannot.

In other words, since each information processing apparatus has different security functions, some apparatuses are unable to take sufficient countermeasures against attacks via the network.
In addition, if an apparatus was not sufficiently prepared to deal with a detected attack, it was necessary to update security-related software, such as updating of the pattern files, in order to deal with the attack, and it was not possible to prepare quickly to prevent the attack, which made it difficult to take early countermeasures against the attack.

The present invention was made in view of the above-described circumstances and has an object to provide a communication control system, an information processing apparatus, and a communication control method, configured such that, when an unauthorized attack via a network is detected, an appropriate countermeasure can be taken for the information processing apparatus corresponding to the attack countermeasure function of the information processing apparatus that detected the unauthorized attack, and other information processing apparatuses can be notified of the countermeasure method against the attack quickly so as not to be subjected to the unauthorized attack, so that each information processing apparatus can promptly and appropriately deal with the unauthorized attack.

SUMMARY OF THE INVENTION

This invention provides a communication control system including an information processing apparatus and a communication control device connected to a network, in which the information processing apparatus includes: an attack detector that detects an unauthorized attack, a detection information notifier that transmits attack detection information concerning the detected attack to the communication control device, a countermeasure instruction information acquirer that acquires attack countermeasure instruction information transmitted from the communication control device, a countermeasure instruction determiner that decides a countermeasure method to be executed against the attack from the acquired attack countermeasure instruction information, and an attack countermeasure executor that executes the decided countermeasure method against the attack, and the communication control device includes: a detection information acquirer that acquires the attack detection information transmitted from the information processing apparatus, a storage that stores in advance attack countermeasure information including an attack detection content concerning a predicted attack, an attack countermeasure function which is a function held by the information processing apparatus in order to deal with the attack, and an attack countermeasure instruction associated with the attack detection content and the attack countermeasure function and indicating a countermeasure method to be executed against the predicted attack of the attack detection content, an attack countermeasure decider that selects an attack countermeasure instruction associated with an attack detection content that matches the attack detection information and the attack countermeasure function of the information processing apparatus which transmitted the attack detection information by using the transmitted attack detection information and the attack countermeasure information and decides a countermeasure method to be executed against the attack, and a countermeasure instruction information generator which generates attack countermeasure instruction information including the decided countermeasure method and transmits the attack countermeasure instruction information to the information processing apparatus which transmitted the attack detection information, in which when the information processing apparatus which transmitted the attack detection information to the communication control device acquires the attack countermeasure instruction information, the countermeasure method against the attack indicated in the acquired attack countermeasure instruction information is executed.

In addition, in the case where a plurality of information processing apparatuses and a communication control device are connected via a network, the attack countermeasure function included in the attack countermeasure information is stored for each of the plurality of information processing apparatuses, the attack countermeasure decider selects an attack countermeasure instruction associated with the attack detection content that matches the attack detection information and the attack countermeasure function of a second information processing apparatus other than the first information processing apparatus which transmitted the attack detection information by using the transmitted attack detection information and the attack countermeasure information and decides the countermeasure method to be executed against the attack in the second information processing apparatus, and the countermeasure instruction information generator generates second attack countermeasure instruction information including the decided countermeasure method and transmits the second attack countermeasure instruction information to the second information processing apparatus other than the first information processing apparatus which transmitted the attack detection information.

In addition, when the second attack countermeasure instruction information transmitted to the second information processing apparatus includes a countermeasure method against an attack indicating that communication with the first information processing apparatus which transmitted the attack detection information is to be blocked, the attack countermeasure executor of the second information processing apparatus blocks communication between the second information processing apparatus and the first information processing apparatus.

In addition, the communication control device further includes a communication blocking controller that blocks communication with a predetermined information processing apparatus, and when the detection information acquirer acquires the attack detection information transmitted from the information processing apparatus, the communication blocking controller blocks communication with the information processing apparatus which transmitted the attack detection information.

In addition, the communication control device further includes a pseudo-attack diagnosis section that performs a diagnosis against an unauthorized attack by pseudo-executing an attack similar to the unauthorized attack detected in the first information processing apparatus against the second information processing apparatus other than the first information processing apparatus which detected the unauthorized attack, the attack countermeasure information further includes a pseudo-attack diagnosis including a pseudo-executed attack content and a diagnosis result in the case of the attack set in advance, the attack countermeasure information including the attack countermeasure instruction associated with the attack detection content, the attack countermeasure function, and the pseudo-attack diagnosis and indicating the countermeasure method to be executed against the predicted attack of the attack detection content is stored in advance, after the attack detection information is acquired from the first information processing apparatus which detected the unauthorized attack, the pseudo-attack diagnosis section performs a diagnosis by pseudo-executing an attack similar to the unauthorized attack against the second information processing apparatus, the attack countermeasure decider selects the attack countermeasure instruction associated with the attack detection content that matches the attack detection information, the attack countermeasure function of the second information processing apparatus, and the pseudo-attack diagnosis that matches the diagnosis generated by the pseudo-attack diagnosis section by using the attack detection information acquired from the first information processing apparatus and the attack countermeasure information and decides the countermeasure method to be executed against the attack, and the countermeasure instruction information generator generates second attack countermeasure instruction information including the decided countermeasure method and transmits the second attack countermeasure instruction information to the second information processing apparatus.

In addition, the communication control device further includes an apparatus information acquirer that acquires setting information concerning the information processing apparatus, the attack countermeasure information further includes apparatus setting information that indicates in advance the setting content required for the information processing apparatus, the attack countermeasure information including the attack countermeasure instruction associated with the attack detection content, the attack countermeasure function, and the apparatus setting information and indicating the countermeasure method to be executed against the predicted attack of the attack detection content is stored in advance, after the attack detection information is acquired from the first information processing apparatus which detected the unauthorized attack, the apparatus information acquirer acquires the setting information currently set in the second information processing apparatus from the second information processing apparatus other than the first information processing apparatus which detected the unauthorized attack, the attack countermeasure decider selects the attack countermeasure instruction associated with the attack detection content that matches the attack detection information, the attack countermeasure function of the second information processing apparatus, and the apparatus setting information that matches the acquired setting information currently set in the second information processing apparatus by using the attack detection information acquired from the first information processing apparatus and the attack countermeasure information and decides the countermeasure method to be executed against the attack, and the countermeasure instruction information generator generates second attack countermeasure instruction information including the decided countermeasure method and transmits the second attack countermeasure instruction information to the second information processing apparatus.

In addition, the communication control device is a server that manages communication to the information processing apparatus, or a router that monitors data sent to and received from an external network to the information processing apparatus.

In addition, this invention provides an information processing apparatus connected to a communication control device via a network, and the information processing apparatus includes: an attack detector that detects an unauthorized attack, a detection information notifier that transmits attack detection information concerning the detected attack to the communication control device, a countermeasure instruction information acquirer that acquires attack countermeasure instruction information transmitted from the communication control device, a countermeasure instruction determiner that decides a countermeasure to be executed against the attack from the acquired attack countermeasure instruction information, and an attack countermeasure executor that executes the decided countermeasure method to be executed against the attack, and after the attack detector detects the unauthorized attack, the detection information notifier transmits the attack detection information concerning the detected attack to the communication control device, and when the attack countermeasure instruction information including the countermeasure method against the attack decided from the attack countermeasure instruction associated with the attack detection information and the attack countermeasure function of the information processing apparatus which transmitted the attack detection information stored in advance in the communication control device is transmitted from the communication control device, the countermeasure instruction information acquirer acquires the transmitted attack countermeasure instruction information, the countermeasure instruction determiner decides the countermeasure method to be executed against the attack from the acquired attack countermeasure instruction information, and the attack countermeasure executor executes the decided countermeasure method against the attack.

In addition, this invention is a communication control method of a communication control system in which an information processing apparatus and a communication control device are connected and includes: attack detecting of detecting an unauthorized attack, by means of the information processing apparatus, detection information notifying of transmitting attack detection information concerning the detected attack from the information processing apparatus to the communication control device, detection information acquiring of acquiring the attack detection information transmitted from the information processing apparatus, by means of the communication control device, by using attack countermeasure information which is the attack countermeasure information stored in advance in the communication control device and includes an attack detection content concerning a predicted attack, an attack countermeasure function which is a function held by the information processing apparatus in order to deal with the attack, and an attack countermeasure instruction associated with the attack detection content and the attack countermeasure function and indicating a countermeasure method to be executed against the predicted attack of the attack detection content and the acquired attack detection information, attack countermeasure deciding of selecting an attack countermeasure instruction associated with an attack detection content that matches the attack detection information and an attack countermeasure function of the information processing apparatus which transmitted the attack detection information and deciding a countermeasure method to be executed against the attack, by means of the communication control device, countermeasure instruction information generating of generating attack countermeasure instruction information including the decided countermeasure method and transmitting the attack countermeasure instruction information to the information processing apparatus which transmitted the attack detection information, by means of the communication control device, countermeasure instruction information acquiring of acquiring the attack countermeasure instruction information transmitted from the communication control device, by means of the information processing apparatus, countermeasure instruction determining of deciding a countermeasure method to be executed against the attack from the acquired attack countermeasure instruction information, by means of the information processing apparatus, and attack countermeasure executing of executing the decided countermeasure method against the attack, by means of the information processing apparatus.

According to this invention, since the information processing apparatus detects an unauthorized attack and transmits the attack detection information concerning the detected attack to the communication control device, the communication control device selects the attack countermeasure instruction associated with the attack detection content that matches the attack detection information and the attack countermeasure function of the information processing apparatus which transmitted the attack detection information and decides the countermeasure method to be executed against the attack by using the attack detection information transmitted from the information processing apparatus and the attack countermeasure information stored in advance, generates the attack countermeasure instruction information including the decided countermeasure method and transmits the attack countermeasure instruction information to the information processing apparatus which transmitted the attack detection information, and the information processing apparatus decides the countermeasure method to be executed against the attack from the attack countermeasure instruction information transmitted from the communication control device and executes the decided countermeasure method against the attack, in the information processing apparatus in which the unauthorized attack is detected, an appropriate countermeasure can be taken against the unauthorized attack.

In addition, when a plurality of the information processing apparatuses and the communication control devices are connected via the network, the attack countermeasure function included in the attack countermeasure information is stored for each of the plurality of the information processing apparatuses, and the communication control device selects the attack countermeasure instruction associated with the attack detection content that matches the attack detection information and the attack countermeasure function of the second information processing apparatus other than the first information processing apparatus which transmitted the attack detection information by using the transmitted attack detection information and the attack countermeasure information stored in advance, decides the countermeasure method to be executed against the attack in the second information processing apparatus, generates second attack countermeasure instruction information including the decided countermeasure method, and transmits the second attack countermeasure instruction information to the second information processing apparatus other than the first information processing apparatus which transmitted the attack detection information and thus, a rapid and appropriate countermeasure can be taken for the second information processing apparatus in which an unauthorized attack has not been detected yet or the second information processing apparatus which was not prepared to deal with an unauthorized attack so that they are not subjected to an unauthorized attack.

BRIEF DESCRIPTION OF THE DRAWINGS

FIG. 1 An explanatory view of an embodiment of a schematic configuration of a communication control system of the present invention.

FIG. 2 A configuration block diagram of an embodiment of an image forming apparatus of the present invention.

FIG. 3 A configuration block diagram of an embodiment of a communication control device of the present invention.

FIG. 4 An explanatory view of an embodiment of attack detection information stored in a storage of the image forming apparatus of the present invention.

FIG. 5 An explanatory view of an embodiment of information stored in the storage of the image forming apparatus of the present invention.

FIG. 6 An explanatory view of an embodiment of information stored in a storage of the communication control device of the present invention.

FIG. 7 An explanatory view of an embodiment of attack countermeasure instruction information generated by the communication control device of the present invention.

FIG. 8 An explanatory view of an embodiment of attack countermeasure information stored in the storage of the communication control device of the present invention.

FIG. 10 An explanatory view of an embodiment of attack countermeasure information stored in the storage of the communication control device of the present invention.

FIG. 13 An explanatory view of an embodiment of attack countermeasure information stored in the storage of the communication control device of the present invention.

FIG. 15 An explanatory view of an embodiment of attack countermeasure information stored in the storage of the communication control device of the present invention.

DESCRIPTION OF THE PREFERRED EMBODIMENTS

Figure 9:
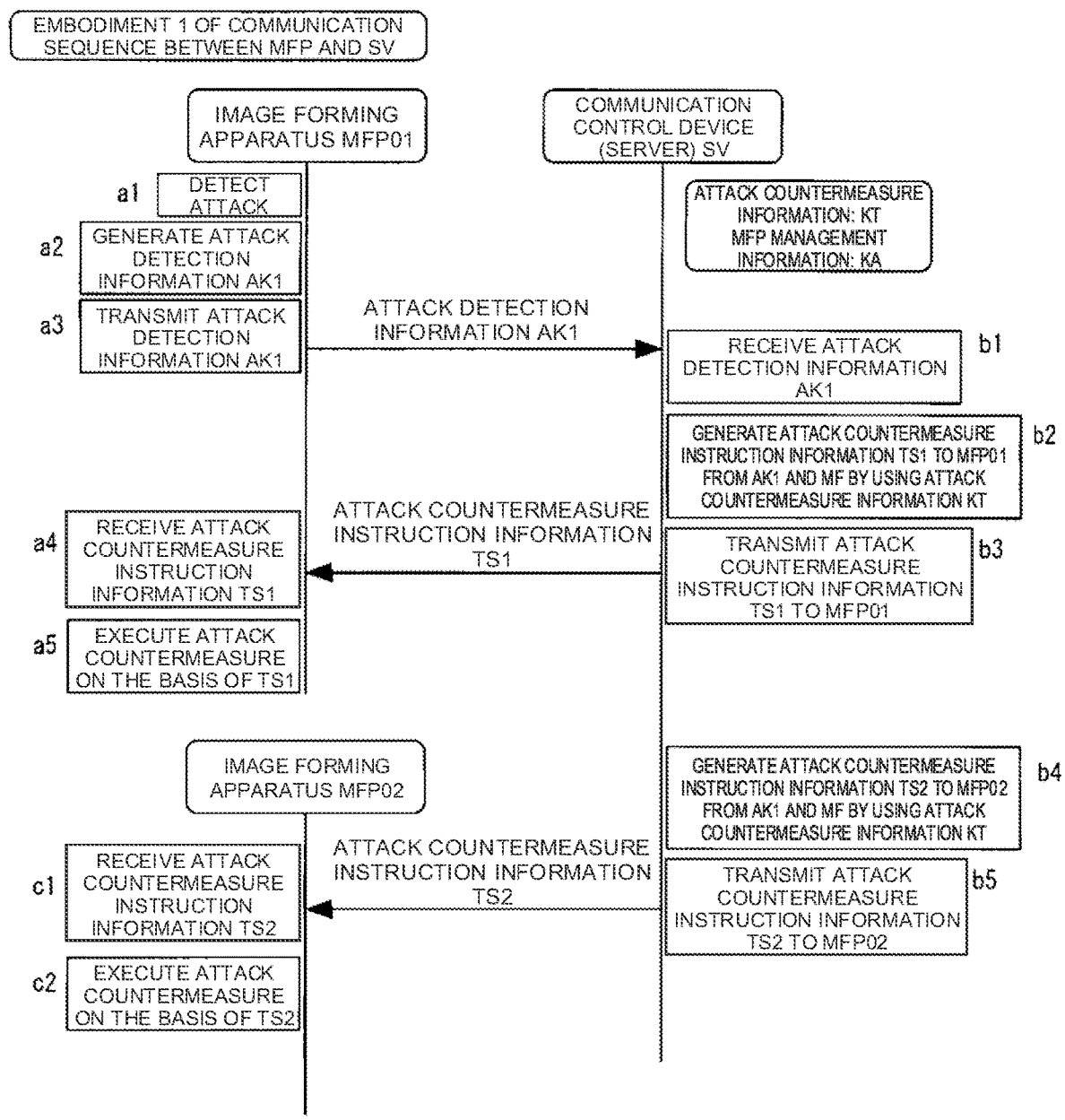
FIG. 9 A communication sequence diagram of an embodiment 1 for attack detection and attack countermeasure instruction performed between the image forming apparatus and the server of the present invention.

Embodiments of the present invention will be described using the drawings below. Note that the present invention is not limited to the description of the embodiments below.
Schematic Configuration of the Communication Control System
This invention is a communication control system having a function for detecting unauthorized attacks and the like carried out via an external network such as the Internet and blocking unauthorized communication. FIG. 1 illustrates an explanatory view of an embodiment of schematic configuration of a communication control system of the present invention. The communication control system mainly includes an image forming apparatus 1 corresponding to an information processing apparatus connected to a network 2, and a communication control device 3.
An attack executing device 5 (ATC) is a device connected to an external network 4 such as the Internet, and is assumed to be a device that executes malicious and unauthorized attacks against the image forming apparatus 1 included in a communication control system.

An information processing apparatus is an apparatus mainly connected to a premises network (LAN: local area network, premises communication network) 2 and having a detection function for unauthorized attacks and a blocking function for unauthorized communication and the like, and the information processing apparatus includes, for example, a personal computer, a mobile terminal, an information communication apparatus, and an image forming apparatus.

A communication control device (hereinafter also referred to as a server, attack countermeasure control device, or simply SV) 3 is connected to a wide area network (WAN: wide area network) 4 such as the Internet and the above-mentioned premises network LAN 2, is present in the communication control system, and has a function of managing information on a plurality of information processing apparatuses connected to the same premises network LAN 2, of giving attack countermeasure instructions to the plurality of information processing apparatuses, and of blocking unauthorized communication. Note that a network configuration may be such that the communication control device SV (server) 3 is not directly connected to the external network 4, but is connected via a router.

The communication control device SV (server) 3, in particular, acquires detection information concerning unauthorized attacks, setting information and the like from the plurality of information processing apparatuses, and transmits to the information processing apparatuses an attack countermeasure method that is associated with the acquired detection information, setting information and the like.

The communication control device SV (server) 3 corresponds, for example, to a server that manages communication to an information processing apparatus, or a router that monitors data sent/received between the external network and the information processing apparatus.

In the case where the information processing apparatus 1 is the image forming apparatus shown below, the communication control device 3 mainly receives attack detection information sent from the image forming apparatus 1, generates appropriate countermeasure instruction information for each of the image forming apparatuses by using the attack detection information and management information of each of the image forming apparatuses 1 and delivers it to the image forming apparatus 1 and blocks the attack to the image forming apparatus 1 from the attack executing device 5 (ATC) connected to the external network 4 such as the Internet and the like.

In the following embodiments of the present invention, the communication control system is assumed to be constituted by the communication control device SV (server) 3 and the plurality of information processing apparatuses such as the image forming apparatus 1.

If the plurality of image forming apparatuses 1 are connected to the same premises network 2, one of the plurality of image forming apparatuses may operate as the communication control device 3.

In the following embodiments, unauthorized attack detection processing and communication blocking processing and the like for the image forming apparatus 1 among the information processing apparatuses will be described. However, it is not limited to the image forming apparatuses, and the contents of the following embodiments can also be applied to other information processing apparatuses such as personal computers.

Configuration of Image Forming Apparatus FIG. 2 shows a configuration block diagram of an embodiment of the image forming apparatus of the present invention.

The image forming apparatus (hereinafter also referred to as an MFP: Multifunction Peripheral) 1 is an apparatus that processes image data, such as an electronic apparatus having a copying (copy) function, a printing function, a manuscript reading (scanning) function, a manuscript editing function, a manuscript storing function, a manuscript transmitting (facsimile, FAX) function, a communication function and the like.

In the following embodiments, the image forming apparatus 1 of the present invention will be described as having, in particular, a copy (copying) function, a manuscript reading (scanning) function, a printing function, an attack detection function, and a communication function, but it may also have other functions.

In addition, the image forming apparatus 1 of the present invention is connected to another image forming apparatus 1 and the communication control device 3 via the premises network 2 such as a LAN, and has a function for communicating information such as images, figures, characters and the like, and attack detection information to the communication control device 3.

In FIG. 2, the image forming apparatus (MFP) 1 of the present invention mainly includes a controller 11, an operator 12, a display 13, an image processor 14, a communicator 18, an attack detector 21, a detection information notifier 22, a countermeasure instruction information acquirer 23, a countermeasure instruction determiner 24, an attack countermeasure executor 25, a communication blocking controller 26, and a storage 30.

The image processor 14 mainly includes an image input section 15, an image former 16, and an image output section 17.

The controller 11 is a section that controls the operation of each component such as the operator and the image processor, and is realized mainly by a microcomputer constituted by a CPU, ROM, RAM, I/O controller, timer and the like.

The CPU organically operates various kinds of hardware on the basis of a control program stored in advance in the ROM and the like, so as to execute the image forming function, the attack detection function and the like of the present invention.

In addition, among the above constituent elements, the attack detector 21, the detection information notifier 22, the countermeasure instruction information acquirer 23, and the countermeasure instruction determiner 24 are functional blocks in which the CPU executes respective processing on the basis of the predetermined program.

The operator 12 is an input device for users of the image forming apparatus to perform predetermined input operations. For example, the operator 12 is a section that performs inputs of information such as characters and selection and inputs of functions, and a keyboard, a mouse, a touch panel and the like are used.

The keys operated by the user include an operation start key, a function selection key, a setting key and the like.

The user executes scanning of a manuscript by operating the touch panel or entering the start key of the scanning operation, for example.

In addition, by operating the touch panel or inputting a predetermined selection key, the user can perform the selection and input of setting information about the manuscript and the selection and input of image data to be transmitted.

The display 13 is a section that displays information and displays information required for executing each function, a result of the execution of the function and the like in order to inform the user thereof. For example, in a case where an LCD, an organic EL display or the like is used and the touch panel is used as the operator 12, the display 13 and the touch panel are placed so as to overlap each other.

The display 13 displays, for example, information required for setting the setting items used for printing and the like of the image forming apparatus, for executing the manuscript scanning function and the like, information on the detected attack, and an operation screen of the selected function by using characters, symbols, figures, images, icons, animations, moving images and the like.

The image processor 14 is a section that executes an image forming function, which is a major function of the image forming apparatus, and mainly includes an image input section 15, an image former 16, and an image output section 17.

The image input section 15 is a section that inputs predetermined image data, the image former 16 is a section that converts the input image data into information that can be printed or the like, and the image output section 17 is a section that outputs print information or the like to a print sheet or the like.

The image input section 15 is a section that inputs the image data of a manuscript containing images, characters/figures and the like and is a section that scans a manuscript placed on a manuscript table or the like, for example.

A scanner (reading device) that scans a manuscript on which information is described is used as the image input section 15.

The image forming apparatus 1 includes a manuscript loading table (manuscript table) on which a manuscript is placed for scanning the manuscript, and a manuscript cover for holding the manuscript.

In addition, the image forming apparatus 1 may include an automatic document feeder (ADF: Automatic Document Feeder) on which a plurality of manuscripts are placed and are automatically conveyed so as to be scanned one by one.

There are various methods for inputting image information, and a manuscript containing an image or the like is scanned by a scanner, and image data of the manuscript (hereinafter referred to as input document data) is stored in the storage 30, for example.

In addition, an interface that connects an external storage medium, such as a USB memory, corresponds to the image input section 15, for example.

It may be configured such that an electronic data file such as image information to be input is stored in an external storage medium such as a USB memory and then, the USB memory or the like is connected to an input interface such as a USB terminal, and a predetermined input operation is performed on the operator 12 so that the desired electronic data file stored in the USB memory or the like is read out and stored as input document data in the storage 30.

In a case where input document data is to be printed on a recording medium, for example, the image former 16 sequentially executes each of the steps of charging, exposing, developing, transferring, cleaning, static eliminating, and fixing so as to form the input document data on the recording medium.

In the developing step, toner is replenished from a toner cartridge into a developing device, and an electrostatic latent image formed on the surface of a charged photosensitive drum is developed, and a toner image corresponding to the electrostatic latent image is formed. The toner image formed on the surface of the photosensitive drum is transferred to the recording medium by a transfer device and then, heated by a fixing device and fixed on the recording medium.

In addition, the image former 16 converts the input document data into information in a form that can be transferred and displayed.

The image output section 17 is a section that outputs the formed input document data and corresponds to a printer, for example, and prints the input document data of the read-out manuscript on a predetermined printing paper (paper medium).

However, the output of the input document data is not limited to printing, but also includes storage of the input document data of the scanned manuscript, and fax transmission of the input document data of the scanned manuscript. For example, storing of the input document data of the scanned manuscript in an external storage medium such as a USB memory, transmitting of the input document data to another information processing apparatus or a server via a network such as the Internet, and categorizing and saving of the data in a specific storage folder also correspond to the image output.

The communicator 18 is a section that communicates information with the communication control device (server) 3 and other information processing apparatuses via the network 2.

For example, electronic data files transferred from information processing apparatuses such as personal computers and mobile terminals are received. In addition, the input document data generated by the image forming apparatus 1 of the present invention is transferred to an external storage device (such as a USB memory) connected to the image forming apparatus 1, or transmitted via the network 2 to an information processing apparatus such as a personal computer or a server owned by the user who input the document.

The network 2 is illustrated as a single LAN, but may be a network including a plurality of segments through routers. The communication form between the image forming apparatus 1 and the communication control device (server) 3 or other information processing apparatuses may use either wired communication or wireless communication.

Each segment LAN may be an internal segment LAN connecting a plurality of image forming apparatuses and the like belonging to a single company, or an external segment LAN connecting a plurality of image forming apparatuses and the like installed outside the company.

The attack detector 21 is a section that executes the attack detection process to detect unauthorized attacks.

It mainly monitors data sent and received via the network 2 and detects files such as computer viruses that execute unauthorized logins or unauthorized processes.

In the following, data and files that execute unauthorized processes are referred to as attack detection data.

For example, a pattern file of a known computer virus or the like is stored in the storage 30 in advance, and if there is data that matches the pattern file in the data received via the network 2, the attack detector 21 determines that an attack has been detected.

When an attack is detected, the data that matches the pattern file is stored as attack detection data and quarantined to prevent unauthorized processes from being executed.

When the attack detector 21 detects an unauthorized login or unauthorized process, it collects and stores information about the unauthorized process and the like together with the attack detection data.

The collected information is transmitted to the server SV as attack detection information, as described below.

Further, if a pattern file of known attack detection data and a countermeasure program such that the attack detection data is removed are stored in the storage 30 in advance, the countermeasure program corresponding to the known attack detection data may be executed when the known attack detection data is detected.

The countermeasure program, for example, blocks communication via the network or deletes the data transmitted by a destination that transmitted the attack detection data.

The detection information notifier 22 is a section that generates information about attacks detected by the attack detector 21 and transmits that information to the server SV. The information about the attack that is transmitted to the server SV is called attack detection information.

FIG. 4 illustrates an explanatory view of an embodiment of the attack detection information stored in the storage of the image forming apparatus of the present invention.

In FIG. 4, attack detection information AK shows the one constituted by eight information items, for example. As an example of the data of the attack detection information AK, an information content in the case of an attack called unauthorized login is shown.

Among the attack detection information AK, MFP identification information is information that identifies the attacked image forming apparatus MFP and a model number of the MFP and a serial number of the MFP are stored as MFP identification information, for example.

An attack content type is information that identifies the type of the attack, and if the attack is an "unauthorized login" using an unauthorized login name, the "unauthorized login" is stored as the attack content type.

Furthermore, the attack detection information AK stores information that identifies the attacker's apparatus that made the unauthorized login (IP address of the attacker, port number of the attacker) and information that identifies the image forming apparatus that was attacked (IP address of the attacked, port number of the attacked).

The login name used and the login password used which were used for the unauthorized login are also stored.

Each time an attack is detected, the detection information notifier 22 generates and transmits the attack detection information AK as described above to the server SV.

Note that the information items of the attack detection information AK are not limited to those shown in FIG. 4, and the necessary information items may be added or deleted in accordance with the attack content type.

The countermeasure instruction information acquirer 23 is a section that acquires attack countermeasure instruction information transmitted from the communication control device (server SV) and stores it as acquired countermeasure instruction information.

The attack countermeasure instruction information is information generated by the server SV and indicates the countermeasure method to be executed against the detected attack. The attack countermeasure instruction information will be described below.

The countermeasure instruction determiner 24 is a section that analyzes the acquired attack countermeasure instruction information and decides a countermeasure method to be executed against the attack.

For example, if the acquired attack countermeasure instruction information includes information about "login prohibition," the system determines that the countermeasure method to be executed is login prohibition and prohibits login from the IP address included in the attack countermeasure instruction information in the future.

The attack countermeasure executor 25 is a section that executes the countermeasure method against the attack decided by the countermeasure instruction determiner 24.

As described below, when the image forming apparatus which transmitted the attack detection information to the communication control device acquires the attack countermeasure instruction information, it executes the countermeasure method against the attack indicated in the acquired attack countermeasure instruction information.

For example, when the countermeasure method to be executed is login prohibition, such a countermeasure is executed that a login from the IP address included in the countermeasure instruction information is ignored and the login is prohibited the next time.

The communication blocking controller 26 is a section that blocks communication to the image forming apparatus MFP.

For example, it blocks reception of data sent from another image forming apparatus MFP or from the attack executing device ATC via the network 4, and further blocks transmission of unauthorized data that is attempted to be sent from its own image forming apparatus MFP to another image forming apparatus MFP or the server SV.

The storage 30 is a section that stores information and programs required for executing each function of the image processing apparatus of the present invention, and a semiconductor storage device such as ROM, RAM, flash memory and the like, a storage device such as HDD, SSD and the like or any other storage medium is used.

The storage 30 stores, for example, MFP setting information 31, attack countermeasure function information 32, attack detection information 33, acquired countermeasure instruction information 34 and the like.

The MFP setting information 31 is information set in the image forming apparatus MFP, and information on whether execution of a predetermined function provided in the image forming apparatus should be permitted or prohibited is stored in advance, for example.

The attack countermeasure function information 32 is information that sets a function (attack countermeasure function) that the image forming apparatus has to deal with an attack on the image forming apparatus, and whether the attack countermeasure function is to be executed or not is set in advance for each attack countermeasure function, for example.

The MFP setting information 31 and the attack countermeasure function information 32 are transmitted from the image forming apparatus MFP to the server SV and are used when attack countermeasure instruction information is to be generated.

FIG. 5 illustrates an explanatory view of the embodiment of information stored in the storage 30 of the image forming apparatus. FIG. 5 illustrates an example of the MFP setting information 31 (MS) and the attack countermeasure function information 32 (MF).

The MFP setting information 31 (MS) in FIG. 5 shows two setting items. For example, there is a setting item for "Print from external network permitted or not" and the information "Print permitted" is set in this setting item, so that a print request transmitted from an image forming apparatus or other information processing apparatuses connected to a network LAN of an external segment is received, and print of the information for which print was requested on a predetermined sheet is permitted.

However, if "print not permitted" is set, print is not performed even if a print request is received from an image forming apparatus or the like connected to the network LAN of the external segment.

In addition, since the information "print not permitted" is set in the setting item "Print from network permitted or not", even if a print request is received from the image forming apparatus, other information processing apparatuses or the like connected to any of the networks such as the Internet and a premises network LAN, print of the information for which print was requested on a predetermined sheet is not permitted.

The attack countermeasure function information 32 (MF) in FIG. 5 shows a case in which the image forming apparatus has seven functions, all of which are set to "Yes," which means that the function is executed.

In the attack countermeasure function information 32 (MF) in FIG. 5, "login control function for each segment" means a function that controls permission and prohibition of login for each segment.

The "function to prohibit login via network" means a function to prohibit login via a network such as the Internet or a premises network LAN.

The "print control function for each segment" means the function to control permission and prohibition of print for each segment.

The "function to prohibit print via network" means the function to prohibit print via a network such as the Internet or a premises network LAN.

The "login control function for each IP address" means the function to control the permission and prohibition of login for each IP address.

The "print control function for each IP address" means the function to control the permission and prohibition of printing for each IP address.

The "Login name disable function" means a function to disable a login name so that a login is not accepted with a specific login name.

However, if "No" is set for any function, it means that the function is not executed or that the function is not provided.

The attack detection information 33 (AK) is information about detected attacks and is generated by the detection information notifier 22 as shown in FIG. 4 above, and is information that is transmitted to the server SV.

The acquired countermeasure instruction information 34 (TS) is information indicating a countermeasure method against an attack, and corresponds to the attack countermeasure instruction information 86 transmitted from the server SV, and is stored in the storage 30.

FIG. 7 shows an explanatory view of the embodiment of the attack countermeasure instruction information 86 (TS).

The attack countermeasure instruction information 86 (TS) is the same as the acquired countermeasure instruction information 34 (TS).

In FIG. 7, three pieces of the attack countermeasure instruction information 86 (TS) are shown.

Each of them contains the transmission destination MFP identification information and the attack countermeasure content type, and other necessary information for each type is stored.

In the transmission destination MFP identification information, the model number and serial number of the image forming apparatus MFP at the transmission destination is set.

The type name of the attack to be dealt with is set in the attack countermeasure content type.

If the attack countermeasure content type is "Login Prohibited," for example, the IP address to be prohibited and the port number to be prohibited are set as the necessary information. This IP address to be prohibited and the port number to be prohibited are the IP address and the port number of the transmission source of the login.

If the attack countermeasure content type is "data reception prohibited", the discarded IP address range and the discarded port number range are set as necessary information.

This discarded IP address range and discarded port number range are the range of IP addresses and port numbers of the transmission source which sends the data.

If the attack countermeasure content type is "Login prohibited" and the MFP has a function to disable login, the login name to be disabled is set as the required information, for example.

If a login name to be disabled is set, logins using that login name are not accepted regardless of the apparatus from which they are sent.

Configuration of the Communication Control Device (server) FIG. 3 shows a configuration block diagram of an embodiment of a communication control device (server) of the present invention.

A communication control device (server SV) 3 is a device that manages information transmitted from an information processing apparatus such as an image forming apparatus. In addition, as described above, the server SV is a device that generates countermeasure instruction information against attacks (attack countermeasure instruction information) using attack detection information sent from the image forming apparatus 1 and MFP management information including the attack countermeasure function of the image forming apparatus acquired in advance and the like, and transmits the generated attack countermeasure instruction information to the image forming apparatus 1.

Since the attack countermeasure instruction information is generated using the attack countermeasure function of the image forming apparatus, the information is different for each image forming apparatus, and a unique attack countermeasure method which is appropriate for each image forming apparatus is transmitted to the image forming apparatus.

In FIG. 3, the communication control device (server SV) 3 of the present invention mainly includes a controller 71, a communicator 72, a detection information acquirer 73, an attack countermeasure decider 74, a countermeasure instruction information generator 75, an apparatus information acquirer 76, a pseudo-attack diagnosis section 77, a communication blocking controller 78, and a storage 80.

The controller 71 is a section that controls the operation of each component such as the communicator and the countermeasure instruction information generator, and is realized mainly by a microcomputer including a CPU, a ROM, a RAM, an I/O controller, a timer and the like.

The CPU executes the communication function and the like of the server SV by organically operating the various types of hardware on the basis of the control program stored in ROM and the like in advance.

The communicator 72 is a section that communicates information with an information processing apparatus such as an image forming apparatus via the premises network 2. It also communicates information with other information processing apparatuses and the like via the network 4 such as the Internet.

For example, it receives electronic data files and the attack detection information transferred from information processing apparatuses such as personal computers, mobile terminals, and image forming apparatuses. The attack countermeasure instruction information is transmitted to the image forming apparatus 1 by using the attack detection information from the image forming apparatus 1 of the present invention.

The detection information acquirer 73 is a section that acquires the attack detection information 33 transmitted from the image forming apparatus 1 and stores it as acquired detection information 83.

The attack countermeasure decider 74 is a section that uses attack countermeasure information 81 described below to decide the countermeasure to be executed against the attack.

Mainly, the attack countermeasure decider 74 selects an attack countermeasure instruction associated with the attack detection content that matches the attack detection information and the attack countermeasure function of the image forming apparatus MFP which transmitted the attack detection information by using the transmitted attack detection information 33 and the attack countermeasure information 81 and decides the countermeasure method against the attack.

As will be described below, the attack countermeasure information 81 is stored in advance in the storage 80 of the communication control device (server SV), and the attack countermeasure information 81 is stored in association with, for example, the attack detection information (AK), the attack countermeasure function (MF), and the attack countermeasure instruction (TSH).

If the attack countermeasure instruction (TSH) that can correspond to the attack detection information (AK) sent from an image forming apparatus MFP01 and the attack countermeasure function (MF) of that image forming apparatus MFP01 is stored in the attack countermeasure information 81, the information described in the attack countermeasure instruction (TSH) is decided to be the countermeasure method against the attack in the image forming apparatus MFP01.

Moreover, the countermeasure method against the attack in another image forming apparatus MFP02 is decided by using the attack detection information (AK) sent from one image forming apparatus MFP01 and the attack countermeasure function (MF) of another image forming apparatus MFP02 that is different from MFP01.

In other words, the countermeasure method against the attack of another image forming apparatus MFP02 that has not been directly attacked yet but might be subjected to the same attack in the future is decided by using the attack detection information (AK) of the attacked image forming apparatus MFP01.

From this attack countermeasure instruction (TSH), the attack countermeasure instruction information (TS) corresponding to the determined countermeasure method is generated, and the attack countermeasure instruction information (TS) is transmitted to another image forming apparatus MFP02 so that another image forming apparatus MFP02 can quickly execute the countermeasure method against this attack, which can prevent the same attack detected by the image forming apparatus MFP01.

The countermeasure instruction information generator 75 is a section that generates attack countermeasure instruction information including the decided countermeasure method and transmits the attack countermeasure instruction information to the image forming apparatus which transmitted the attack detection information.

For example, the attack countermeasure instruction information (TS) which is appropriate for the MFP which transmitted the attack detection information (AK) is generated from the attack countermeasure instruction (TSH) corresponding to attack detection information (AK) acquired from the image forming apparatus MFP and the attack countermeasure function (MF) of the MFP.

The generated attack countermeasure instruction information (TS) is transmitted to the image forming apparatus MFP which transmitted the attack detection information (AK).

Alternatively, the countermeasure instruction information generator 75 generates the attack countermeasure instruction information (TS) to be transmitted to an image forming apparatus (second information processing apparatus) different from that image forming apparatus (first information processing apparatus).

For example, if the attack countermeasure decider 74 selects the attack countermeasure instruction associated with the attack detection content that matches the attack detection information and the attack countermeasure function of the second information processing apparatus other than the first information processing apparatus which transmitted the attack detection information by using the transmitted attack detection information and the attack countermeasure information and decides the countermeasure method to be executed against the attack in the second information processing apparatus, the countermeasure instruction information generator 75 generates second attack countermeasure instruction information including the decided countermeasure method, and transmits the second attack countermeasure instruction information to the second information processing apparatus other than the first information processing apparatus which transmitted the attack detection information.

In particular, when the second attack countermeasure instruction information transmitted to the second information processing apparatus includes a countermeasure method against an attack that indicates blocking of communication with the first information processing apparatus which transmitted the attack detection information, the attack countermeasure executor 25 of the second information processing apparatus blocks communication between the second information processing apparatus and the first information processing apparatus.

The apparatus information acquirer 76 is a section that acquires setting information about the information processing apparatus.

When the information processing apparatus is an image forming apparatus MFP, this section acquires setting information about the image forming apparatus MFP, and is called MFP information acquirer.

The MFP information acquirer acquires, for example, information set in the image forming apparatus MFP (MFP setting information MS) and attack countermeasure function information MF from the image forming apparatus MFP.

The acquired MFP setting information MS is stored as the acquired setting information MS.

In addition, the acquired attack countermeasure function information MF is stored in the MFP management information KA as a part of the information about the image forming apparatus MFP.

The MFP setting information MS and the attack countermeasure function information MF may be acquired from the image forming apparatus MFP at the time of initial setting when the image forming apparatus MFP is connected to the network 2 for the first time, and stored in the storage 80 in advance.

Alternatively, since the MFP setting information MS of the image forming apparatus MFP may be changed by the user in some cases, the MFP setting information MS may be acquired from the image forming apparatus MFP each time when the attack countermeasure method needs to be determined.

In the case where the attack countermeasure method is decided using the setting information about the information processing apparatus, the attack countermeasure information 81 further includes the apparatus setting information that indicates the setting content required for the information processing apparatus in advance, and the attack countermeasure information 81 associated with the attack detection content, the attack countermeasure function, and the apparatus setting information and including the attack countermeasure instruction indicating a countermeasure method to be executed against the predicted attack of the attack detection content is stored in advance in the storage 80 of the server SV.

In addition, as described below, after acquiring the attack detection information from the first information processing apparatus that detected the unauthorized attack, the apparatus information acquirer 76 acquires the setting information that is currently set in the second information processing apparatus from the second information processing apparatus other than the first information processing apparatus that detected the unauthorized attack.

Thereafter, the attack countermeasure decider 74 selects the attack countermeasure instruction associated with an attack detection content that matches the attack detection information, the attack countermeasure function of the second information processing apparatus, and the apparatus setting information that matches the acquired setting information currently set in the second information processing apparatus by using the attack detection information acquired from the first information processing apparatus and the attack countermeasure information and decides the countermeasure method to be executed against the attack.

The countermeasure instruction information generator 75 generates second attack countermeasure instruction information including the decided countermeasure method, and transmits the second attack countermeasure instruction information to the second information processing apparatus.

The pseudo-attack diagnosis section 77 is a section that pseudo-executes an attack similar to an unauthorized attack detected in the first image forming apparatus MFP01 that detected the unauthorized attack against the second image forming apparatus MFP02 other than the first image forming apparatus MFP01 that detected the unauthorized attack, receives a response content from another image forming apparatus MFP02, and performs diagnosis on the unauthorized attack.

In response to this diagnosis result, it is determined whether the second image forming apparatus MFP02 also has the similar vulnerability, and if the second image forming apparatus MFP02 has the similar vulnerability, the countermeasure instruction information generator 75 generates the attack countermeasure instruction information for the second image forming apparatus MFP02

When this pseudo-attack diagnosis is to be performed, the attack countermeasure information 81 furtherer includes the attack content to be pseudo-executed and the pseudo-attack diagnosis for which the diagnosis result when the attack is made is set in advance, and the attack countermeasure information 81 associated with the attack detection content, the attack countermeasure function, and the pseudo-attack diagnosis and including the attack countermeasure instruction indicating the countermeasure method to be executed against the predicted attack of the attack detection content is stored in advance in the storage 80 of the server SV.

As described below, after acquiring the attack detection information from the first information processing apparatus that detected the unauthorized attack, the pseudo-attack diagnosis section 77 performs diagnosis by pseudo-executing an attack similar to the unauthorized attack against the second information processing apparatus other than the first image forming apparatus MFP01 (the first information processing apparatus).

Thereafter, the attack countermeasure decider 74 selects the attack countermeasure instruction associated with the attack detection content that matches the attack detection information, the attack countermeasure function of the second information processing apparatus, and the pseudo-attack diagnosis that matches the result of the diagnosis performed by the pseudo-attack diagnosis section 77 by using the attack detection information acquired from the first information processing apparatus and the attack countermeasure information, and decides the countermeasure method to be executed against the attack.

The countermeasure instruction information generator 75 generates second attack countermeasure instruction information including the decided countermeasure method, and transmits the second attack countermeasure instruction information to the second information processing apparatus.

For example, when an unauthorized login is detected in one image forming apparatus MFP01, and the attack detection information for the unauthorized login is transmitted to the server SV, a login request using the login name and password used in the unauthorized login is pseudo-executed from the server SV to another image forming apparatus MFP02.

If this login request is normally accepted by another image forming apparatus MFP02 and a response indicating that the login was successful is sent back to the server SV, which means that MFP02 accepted the unauthorized login, and the server SV issues a diagnosis result that the pseudo-login succeeded.

In this case, a success of the pseudo-login, which is an unauthorized login, means that MFP02 is vulnerable in the same way as MFP01.

Therefore, in order to prevent MFP02 from being subjected to the unauthorized login detected by MFP01 in the future, attack countermeasure instruction information that can respond to the attack is transmitted to MFP02.

This allows MFP02 to prevent unauthorized logins detected by MFP01.

The communication blocking controller 78 is a section that blocks communication with a predetermined image forming apparatus MFP similarly to the communication blocking controller 26.

For example, when the detection information acquirer 73 acquires the attack detection information transmitted from the image forming apparatus MFP, the communication blocking controller 78 blocks the communication to the image forming apparatus MFP that transmitted the attack detection information.

In addition, if the server SV is a firewall that connects the premises network 2 and the network 4 such as the Internet, it blocks the reception of unauthorized data sent from the attack executing device ATC via the network 4, and also blocks the transmission of unauthorized data to be transmitted from the image forming apparatus MFP to the Internet.

The storage 80 is a section that stores information and programs required for executing each function of the server SV of the present invention, and a semiconductor storage element such as ROM, RAM, and flash memory, a storage device such as HDD, SSD, or any other storage medium is used.

The storage 80 stores, for example, the attack countermeasure information 81 (KT), MFP management information 82 (KA), acquired detection information 83 (AK), acquired setting information 84 (MS), diagnosis result information 85 (SK), attack countermeasure instruction information 86 (TS) and the like.

The attack countermeasure information 81 (KT) is information for deciding the attack countermeasure in the image forming apparatus.

As will be described later, the attack countermeasure information 81 (KT) is information that mainly includes the attack detection content concerning the predicted attack, the attack countermeasure function which is a function held by the information processing apparatus in order to deal with the attack, and the attack countermeasure instruction associated with the attack detection content and the attack countermeasure function and indicating the countermeasure method to be executed against the predicted attack of the attack detection content.

When a plurality of image forming apparatuses 1 and communication control devices are connected via a network, the attack countermeasure function included in the attack countermeasure information is stored for each of the plurality of image forming apparatuses.

In the attack countermeasure information 81 (KT), the attack countermeasure instruction (TSH) are stored in advance in association with the conditions of the attack detection content (KK) and the attack countermeasure function (MF), as shown in FIG. 8 below, for example.

The attack detection content (KK) corresponds to the attack detection information (AK).

The attack detection information (AK) transmitted from the image forming apparatus MFP and the attack countermeasure function (MF) of the MFP stored in advance are acquired, the attack countermeasure information 81 (KT) is referred to, and the attack countermeasure instruction (TSH) corresponding to the acquired information (AK, MF) are sought.

If an attack countermeasure instruction (TSH) is found, the attack countermeasure instruction information (TS) is generated by using the attack countermeasure instruction (TSH), and the attack countermeasure instruction information (TS) is transmitted to the image forming apparatus MFP which transmitted the attack detection information (AK).

In the image forming apparatus MFP, countermeasure processing against the attack is executed on the basis of the received attack countermeasure instruction information (TS).

FIG. 8, FIG. 10, FIG. 13, and FIG. 15, which are described below, show explanatory views of an embodiment of the attack countermeasure information 81 (KT) stored in the storage 80 of the communication control device.

The contents of the respective attack countermeasure information 81 (KT) are described below.

The MFP management information 82 (KA) stores information on the image forming apparatus MFP connected to the server SV.

FIG. 6 shows an explanatory view of an embodiment of information stored in the storage of the server SV.

As shown in FIG. 6, four information items are stored in the MFP management information 82 (KA), for example.

The four information items are MFP identification information (ID), IP address (IP), attack countermeasure function (MF), and MFP setting information (MS).

The MFP identification information (ID) is information to identify the image forming apparatus MFP, and the model number, serial number and the like of the image forming apparatus are used. In FIG. 6, they are denoted as MFP01 and MFP02.

The IP address (IP) is a unique IP address given to the MFP and is information such as 222.333.444.555, for example.

The attack countermeasure function MF corresponds to the attack countermeasure function information 32 shown in FIG. 5 above. In FIG. 6, it shows that the image forming apparatus MFP01 has a login control function for each segment and a print control function for each segment as the attack countermeasure function MF, and does not have a function to prohibit print via a network, for example.

The MFP setting information MS corresponds to the MFP setting information 31 shown in FIG. 5 above.

In FIG. 6, it shows that, in the image forming apparatus MFP01, the setting information MS is set to "Print permitted" for whether print from an external segment is permitted or not and "Print permitted" is also set for whether print via a network is permitted or not.

These pieces of information stored in the MFP management information 82 (KA) are acquired from the MFP.

The information may be acquired from the MFP when the MFP is first connected to the server SV, or, if necessary, the information may be acquired by transmitting information requesting the attack countermeasure function (MF) and the setting information (MS) from the server SV to the MFP. The information items of the image forming apparatus MFP stored in the MFP management information 82 (KA) are not limited to these four items, and in addition, a history of the attack detection information 33 (AK) received in the past may also be stored.

The acquired detection information 83 (AK) is the attack detection information 33 transmitted from the image forming apparatus MFP.

The acquired detection information 83 (AK) also stores data including the information items as shown in FIG. 4 above.

The acquired setting information 84 (MS) is the MFP setting information 31 transmitted from the image forming apparatus MFP. It is the MFP setting information 31 is acquired from the MFP in response to a request from the server SV, when the server SV decides the attack countermeasure instruction information by using the current setting information set in the MFP. The acquired setting information 84 (MS) is assumed to be stored in the MFP management information 82 (KA) described above.

The diagnosis result information 85 (SK) is information that indicates a diagnosis result when a pseudo-attack diagnosis is performed from the server SV to the image forming apparatus MFP, as described below. For example, a login processing similar to the detected unauthorized login is executed to the MFP, and the response from the MFP to the login processing is confirmed to provide a diagnosis result. Since the response from the MFP to the login processing is either a successful login or a failed login, the response content is confirmed, and the diagnosis result of either of a successful login or a failed login is stored.

FIG. 6 shows an embodiment of the diagnosis result information 85 (SK) stored in the storage of the server SV. Here, the diagnosis result information 85 (SK) is shown as including a diagnosis item and a diagnosis result.

For example, for the diagnosis item "Pseudo-login similar to unauthorized login", the diagnosis result of "Login succeeded" or "Login failed" is stored with the login name and password used in the pseudo-login.

Moreover, the identification information of the image forming apparatus MFP that performed the pseudo-attack diagnosis may also be stored in association.

By confirming this diagnosis result, it can be determined whether or not the image forming apparatus MFP that performed the pseudo-attack diagnosis has been already able to defend against the attack, in the event that it receives an unauthorized attack in the future.

The attack countermeasure instruction information 86 (TS) is information that indicates a countermeasure method against an attack, and is information as shown in FIG. 7 above.

The attack countermeasure instruction information 86 (TS) is generated by using the attack countermeasure information 81 stored in advance in the server SV.

When the attack countermeasure instruction (TSH) are stored in the attack countermeasure information 81 in association with the attack detection information (AK) sent from the image forming apparatus MFP and the attack countermeasure function (MF) of the MFP, the information described in the attack countermeasure instruction (TSH) is decided as the countermeasure method against the attack in the MFP and thus, the attack countermeasure instruction information 86 (TS) is generated on the basis of the attack countermeasure instruction (TSH).

For example, if the image forming apparatus which transmitted the attack detection information (AK) is MFP001, the attack countermeasure instruction (TSH) is to suspend login, and the attack detection information (AK) contains the IP address and port number of the attacker, information that identifies the image forming apparatus (transmission destination MFP identification information), information that indicates the content of the attack countermeasure instruction (TSH) (attack countermeasure content type), the attack countermeasure instruction information 86 (TS) that includes the IP address of (prohibited IP address) and port number (prohibited port number) of the attacker is generated.

In this case, as shown in FIG. 7, the attack countermeasure instruction information 86 (TS) is generated with the MFP serial number (MFP0001) as the transmission destination MFP identification information, "login prohibited" as the attack countermeasure content type, "222.333.444.555" as the prohibited IP address, and "400" as the prohibited port number are set, for example.

Embodiment of Attack Detection and Attack Countermeasure Instructions

In the following, some embodiments of processing related to attack detection and attack countermeasure instructions in the communication control system including the image forming apparatus MFP and the communication control device (server) SV are illustrated.

In the following embodiments, it is assumed that an attack is detected in the image forming apparatus MFP01 and the attack detection information AK is transmitted from the image forming apparatus MFP01 to the server SV.

In addition, it is assumed that the MFP management information KA including the attack countermeasure function MF and the attack countermeasure information KT are stored in advance in the server SV.

It is assumed that the attack countermeasure information KT mainly includes the attack detection information AK and attack countermeasure function MF, and stores the attack countermeasure instruction TSH associated with these types of information (AK and MF) is stored.

Embodiment 1

FIG. 8 shows an explanatory view of an embodiment of the attack countermeasure information KT stored in the storage of the communication control device of the present invention.

FIG. 9 shows a communication sequence diagram of Embodiment 1 for the attack detection and attack countermeasure instruction performed between the image forming apparatus and the server of the present invention.

The attack countermeasure information KT shown in FIG. 8 stores the attack detection content KK, the attack countermeasure function MF, and the attack countermeasure instruction TSH in association. The attack detection content KK corresponds to the attack detection information AK.

In addition, FIG. 8 also shows the "execution content of attack countermeasure", which is an operation of the MFP corresponding to the attack countermeasure instruction TSH.

In FIG. 8, six examples of attack countermeasure information are shown.

Here, it is assumed that the attack detection content KK has three attack detection content, and the attack countermeasure function MF has four types of MFP control functions.

The attack detection content KK01 is information that means that an unauthorized login from an external network was detected, and that corresponds to the case where an unauthorized login to the image forming apparatus MFP was detected from the LAN of the segment to which the computers belonging to outside the company are connected, not from the LAN of the segment to which the computers in the company are connected. The fact that a login was made from an external network can be detected such that, for example, if the attacker IP address included in the attack detection information AK is outside the segment of the internal network, it can be detected that the login was made from an external network, not from within the company.

In addition, the fact that a login is unauthorized can be detected by detecting that a large number of login attempts have been made in a short period of time, for example, by using an unauthorized login monitoring program preinstalled in the MFP or the like.

The attack detection content KK02 is information that means that an unauthorized login from the internal network was detected, and that corresponds to the case where an unauthorized login to the image forming apparatus MFP was detected from the LAN of the segment to which the computers in the company are connected.

The fact that a login was made from the internal network can be detected such that, for example, by deciding whether the attacker IP address included in the attack detection information AK is within a segment of the internal network or not. The fact that a login is unauthorized can be detected similarly by an unauthorized login monitoring program or the like.

The attack detection content KK03 is information that means that unauthorized print from the external network was detected, and that corresponds to the case where an unauthorized print instruction to the image forming apparatus MFP was detected from the LAN of the segment to which the external computers are connected.

The fact that a print instruction was given from the external network can be detected such that, for example, by deciding whether the attacker IP address included in the attack detection information AK is outside the segment of the internal network or not.

In addition, the fact that a print instruction is unauthorized can be detected, for example, by detecting that a large number of print instructions have been executed in a short period of time.

The attack countermeasure function MF01 is a login control function for each segment, which means that the MFP has a login control function.

The login control function for each segment is a function to log in to the image forming apparatus from a computer connected to the LAN of one segment, and to control whether this login is permitted or prohibited for each segment.

The attack countermeasure function MF02 is login prohibition via a network, which means that the MFP prohibits all logins via the network such as the Internet.

The attack countermeasure function MF21 is a print control function for each segment, which means that the MFP has a print control function.

The print control function for each segment is a function to give a print instruction to the image forming apparatus from a computer connected to the LAN of one segment, and to control whether the print instruction is permitted or prohibited for each segment.

The attack countermeasure function MF22 is prohibition of print via a network, which means that the MFP prohibits all prints via a network such as the Internet.

In the six types of attack countermeasure information KT in FIG. 8, the attack countermeasure instruction TSH is stored in association with the attack detection content KK and the attack countermeasure function MF. For example, in the first attack countermeasure information, the attack countermeasure instruction TS01 of "Suspend login from external network" is stored in association with the attack detection content KK01 and the attack countermeasure function MF01.

According to this, it means that if the attack detection information transmitted from the MFP corresponds to the attack detection content KK01, and the attack countermeasure function MF01 is included in the attack countermeasure function stored in the management information KA of the MFP, the attack countermeasure instruction TS01 associated with this KK01 and MF01 is selected as the attack countermeasure instruction for the MFP. When this attack countermeasure instruction TS01 is selected, as shown in "Operation of MFP" on the right side thereof, the operation of "Prohibit login from external network for certain period of time" is executed in the MFP (CT01).

Similarly, in the second attack countermeasure information, the attack countermeasure instruction TS02 of "Suspend login via network" is stored in association with the attack detection content KK01 and the attack countermeasure function MF02.

According to this, it means that if the attack detection information transmitted from the MFP corresponds to the attack detection content KK01, and the attack countermeasure function MF02 is included in the attack countermeasure function stored in the management information KA of the MFP, the attack countermeasure instruction TS02 associated with this KK01 and MF02 is selected as the attack countermeasure instruction for the MFP. When this attack countermeasure instruction TS02 is selected, as shown in "Operation of MFP" on the right side thereof, the operation of "Prohibit login via network for certain period of time" is executed in the MFP (CT02).

Similarly in the following, in the third attack countermeasure information, the attack detection information transmitted from the MFP corresponds to the attack detection content KK02, and when the attack countermeasure function MF01 is included in the attack countermeasure function stored in the management information KA of the MFP, the attack countermeasure instruction TS11 associated with this KK02 and MF01 is selected as the attack countermeasure instruction for the MFP, and the operation CT11 of the MFP indicated on the right side thereof is executed in the MFP.

In the following, in the fourth to sixth attack countermeasure information, too, the attack countermeasure instruction TSH associated with the attack detection content KK and the attack countermeasure function MF is selected as the attack countermeasure instruction for the MFP, and the operation CT of the MFP indicated on the right side thereof is executed.

Next, using the communication sequence diagram of Embodiment 1 shown in FIG. 9, processing of attack detection and attack countermeasure instruction of Embodiment 1 executed between the image forming apparatus MFP01 and the server SV will be described.

First, suppose that at step a1 of MFP01, the attack detector 21 detects an attack.

Next, at step a2, the detected attack is analyzed, and attack detection information AK1 is generated. For example, the attack detection information as shown in FIG. 4 is generated. At step a3, the detection information notifier 22 transmits the generated attack detection information AK1 to the server SV.

On the other hand, at step b1 of the server SV, the attack detection information AK1 is received.

Here, the detection information acquirer 73 of the server SV stores the attack detection information AK1 as the acquired detection information AK1. At step b2, the countermeasure instruction information generator 75 generates the attack countermeasure instruction information TS1 for the MFP01 from the acquired detection information AK1 and the attack countermeasure function MF of the MFP01 stored in the storage 70, using the attack countermeasure information KT. At step b3, the countermeasure instruction information generator 75 further transmits the generated attack countermeasure instruction information TS1 to the MFP01.

At step a4, the countermeasure instruction information acquirer 23 of the MFP01 receives the attack countermeasure instruction information TS1 and stores it as the acquired countermeasure instruction information TS1.

At step a5, the attack countermeasure determiner 24 analyzes the received attack countermeasure instruction information TS1, decides an attack countermeasure method to be executed, and on the basis of the received attack countermeasure instruction information TS1, the attack countermeasure executor 25 executes the decided attack countermeasure method.

In addition, if another image forming apparatus MFP02 other than MFP01 is connected to the same LAN as the segment to which MFP01 is connected, the attack countermeasure instruction information is also transmitted to this image forming apparatus MFP02. However, unlike the attack countermeasure instruction information TS1 transmitted to MFP01, the attack countermeasure instruction information TS2 for MFP02 is generated from the acquired detection information AK1 and the attack countermeasure function MF of MFP02 stored in the storage 70.

That is, at step b4 of the server SV, the countermeasure instruction information generator 75 generates the attack countermeasure instruction information TS2 for the MFP02 from the acquired detection information AK1 and the attack countermeasure function MF of the MFP02 stored in the storage 70, using the attack countermeasure information KT. At step b5, the countermeasure instruction information generator 75 transmits the generated attack countermeasure instruction information TS2 to the MFP02.

At step c1 of MFP02, the countermeasure instruction information acquirer 23 of MFP02 receives the attack countermeasure instruction information TS2 and stores it as the acquired countermeasure instruction information TS2.

At step c2 of MFP02, the attack countermeasure determiner 24 of MFP02 analyzes the received attack countermeasure instruction information TS2, decides an attack countermeasure method to be executed, and on the basis of the received attack countermeasure instruction information TS2, the attack countermeasure executor 25 executes the decided attack countermeasure method.

As described above, the acquired countermeasure instruction information corresponding to the attack detection information AK1 detected in MFP01 is transmitted to the two image forming apparatuses (MFP01 and MFP02) belonging to the LAN of the same segment, and the measures to deal with the attack are taken in the both image forming apparatuses.

However, since the acquired countermeasure instruction information TS1 transmitted to MFP01 is generated by considering the attack countermeasure function MF of MFP01, while the acquired countermeasure instruction information TS2 transmitted to MFP02 is generated by considering the attack countermeasure function MF of MFP02, the attack countermeasure methods executed in MFP01 and MFP02 may be different from each other.

That is, in addition to the attack detection information AK1, the attack countermeasure instruction information TS is generated and sent to the image forming apparatus MFP by considering the attack countermeasure function MF of each image forming apparatus MFP, so that each image forming apparatus MFP can appropriately deal with an unauthorized attack.

In the above explanation, an appropriate attack countermeasure instruction appropriate for the image forming apparatus MFP02 was given individually to the image forming apparatus MFP02 other than the image forming apparatus MFP01 which detected an attack, but this is not limiting. If there are a plurality of image forming apparatuses other than the image forming apparatus MFP01 that detected the attack, it is only necessary to execute the attack countermeasure instructions appropriate for those image forming apparatuses individually to all of the plurality of image forming apparatuses.

Embodiment 2

FIG. 10 shows an explanatory view of an embodiment of the attack countermeasure information stored in the storage of the communication control device.

Figure 11:
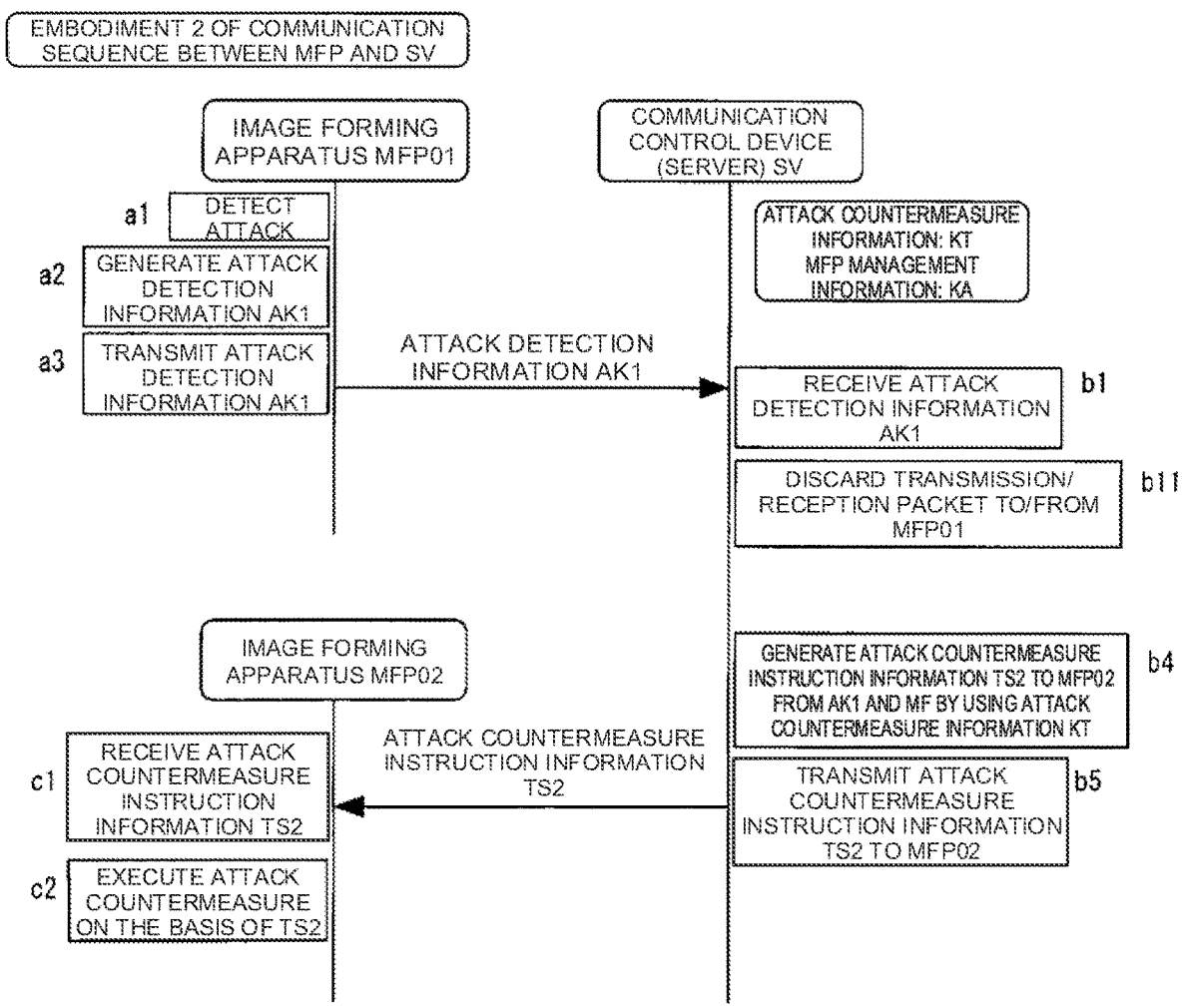
FIG. 11 A communication sequence diagram of an embodiment 2 for attack detection and attack countermeasure instruction performed between the image forming apparatus and the server of the present invention.

FIG. 11 shows a communication sequence diagram of Embodiment 2 for the attack detection and attack countermeasure instruction performed between the image forming apparatus and the server.

Here, an example of a countermeasure method is shown when an attack that falsifies firmware of an image forming apparatus MFP is detected.

For example, when an attack to falsify the firmware is detected in the image forming apparatus MFP01, the image forming apparatus MFP01 has been already subjected to the attack and thus, if the firmware of MFP01 was falsified so that an unauthorized attack can be executed, there is a possibility that a similar unauthorized attack can be given from MFP01 to another image forming apparatus MFP02. In this case, it is desirable to enable other image forming apparatuses MFP02 to execute a countermeasure method against unauthorized attacks that may be executed from the image forming apparatus MFP01.

The attack countermeasure information KT shown in FIG. 10 stores the attack detection content KK, the attack countermeasure function MF, and the attack countermeasure instruction TSH in association similarly to FIG. 8.

In addition, FIG. 10 also shows the "execution content of attack countermeasure", which is an operation of the MFP corresponding to the attack countermeasure instruction TSH.

In FIG. 10, three examples of attack countermeasure information are shown.

Here, it is assumed that the attack detection content KK has one attack detection content, and the attack countermeasure function MF has three types of MFP control functions.

The attack detection content KK31 in FIG. 10 is information that means that falsification of the firmware of the image forming apparatus MFP has been detected.

The fact that the firmware has been falsified can be detected, for example, by calculating the checksum of the firmware at startup of the image forming apparatus MFP and comparing it with a previously stored checksum value or the like.

The attack countermeasure function MF31 is a login control function for each IP address, which means that the MFP has a login control function.

The login control function for each IP address is a function to log in to the image forming apparatus MFP02 from another image forming apparatus MFP01 having one IP address, and to control whether this login is permitted or prohibited for each IP address.

For example, if the login from IP address IP0001 is prohibited, the login from the image forming apparatus MFP01 having IP address IP0001 is ignored or the login is treated as a failure.

In other words, data communication with the image forming apparatus MFP01 having IP address IP0001 is blocked.

The attack countermeasure function MF32 is a consolidated print control function for each IP address, which means that the MFP has the consolidated print control function.

The consolidated print control function for each IP address is a function to control a consolidated print request to the image forming apparatus MFP02 from another image forming apparatus MFP01 having one IP address, and to control whether the consolidated print request is permitted or prohibited.

The consolidated print means, for example, when the image forming apparatus MFP01 is requested to print a plurality of copies, print is performed simultaneously by a plurality of units by requesting the image forming apparatus MFP02 to print half the number of copies from the image forming apparatus MFP01.

The attack countermeasure function MF33 is a packet filtering function, which means that the MFP has a packet filtering function.

The packet filtering function is a function that determines whether data (received packets) transmitted from other image forming apparatuses should be passed through and stored in the own image forming apparatus or discarded on the basis of predetermined standard information such as IP address and port number.

For example, if the IP address of the transmission source of a received packet is not the IP address set in the predetermined standard information, the received packet is discarded.

In the three pieces of attack countermeasure information KT in FIG. 10, the attack countermeasure instruction TSH is stored in association with the attack detection content KK and the attack countermeasure function MF.

For example, in the first attack countermeasure information, the attack countermeasure instruction TS31 of "Stop login from IP address of MFP01" is stored in association with the attack detection content KK31 and the attack countermeasure function MF31.

According to this, if the attack detection information transmitted from the image forming apparatus MFP01 corresponds to the attack detection content KK31, and the attack countermeasure function MF31 is included in the attack countermeasure function stored in the management information KA of the MFP01, it means that the attack countermeasure instruction TS31 associated with this KK31 and MF31 is selected as the attack countermeasure instruction for the MFP01.

When this attack countermeasure instruction TS31 is selected, as shown in "Operation of MFP" on the right side thereof, the operation of "Prohibit login from IP address of MFP01" is executed in MFP01 (CT31).

However, since the attack detection content KK31 is "firmware falsification detection", the attack countermeasure by the attack countermeasure instruction TS31 should not be executed by the image forming apparatus MFP01 which transmitted the attack detection information, but should be executed by an image forming apparatus other than the image forming apparatus MFP01.

Accordingly, the attack countermeasure instruction information TS generated by the attack countermeasure instruction TS31 is transmitted to an image forming apparatus (MFP02, for example) other than the image forming apparatus MFP01, and the operation of "prohibit login from IP address of MFP01" is executed in the image forming apparatus MFP02 (CT31).

Similarly, in the second attack countermeasure information, the attack countermeasure instruction TS32 of "Stop consolidated print from IP address of MFP01" is stored in association with the attack detection content KK31 and the attack countermeasure function MF32.

According to this, it means that if the attack detection information transmitted from the image forming apparatus MFP01 corresponds to the attack detection content KK31, and the attack countermeasure function MF32 is included in the attack countermeasure function stored in the management information KA of the MFP01, the attack countermeasure instruction TS32 associated with this KK31 and MF32 is selected as the attack countermeasure instruction for the MFP01.

However, as described above, since the attack detection content KK31 is "firmware falsification detection", the attack countermeasure by the attack countermeasure instruction TS32 should not be executed by the image forming apparatus MFP01 which transmitted the attack detection information, but should be executed by an image forming apparatus other than the image forming apparatus MFP01.

Accordingly, the attack countermeasure instruction information TS generated by the attack countermeasure instruction TS32 is transmitted to an image forming apparatus (MFP02, for example) other than the image forming apparatus MFP01, and the operation of "prohibit consolidated print from IP address of MFP01" is executed in the image forming apparatus MFP02 (CT32).

In the third attack countermeasure information, the attack countermeasure instruction TS33 of "Discard packet transmitted from IP address of MFP01" is stored in association with the attack detection content KK31 and the attack countermeasure function MF33.

According to this, it means that if the attack detection information transmitted from the image forming apparatus MFP01 corresponds to the attack detection content KK31, and the attack countermeasure function MF33 is included in the attack countermeasure function stored in the management information KA of that MFP01, the attack countermeasure instruction TS33 associated with this KK31 and MF33 is selected as the attack countermeasure instruction for that MFP01.

However, as described above, since the attack detection content KK31 is "firmware falsification detection", the attack countermeasure by the attack countermeasure instruction TS33 should not be executed by the image forming apparatus MFP01 which transmitted the attack detection information, but should be executed by an image forming apparatus other than the image forming apparatus MFP01. Accordingly, the attack countermeasure instruction information TS generated by the attack countermeasure instruction TS33 is transmitted to an image forming apparatus (MFP02, for example) other than the image forming apparatus MFP01, and the operation of "discard packet transmitted from IP address of MFP01" is executed in the image forming apparatus MFP02 (CT33).

Next, using the communication sequence diagram of Embodiment 2 shown in FIG. 11, the processing of the attack detection and the attack countermeasure instruction of Embodiment 2 executed between the image forming apparatus MFP01 and the server SV will be described.

First, suppose that at step a1 of MFP01, the attack detector 21 detects an attack.

Next, at step a2, the detected attack is analyzed, and attack detection information AK1 is generated. For example, the attack detection information as shown in FIG. 4 is generated. At step a3, the detection information notifier 22 transmits the generated attack detection information AK1 to the server SV.

On the other hand, at step b1 of the server SV, the attack detection information AK1 is received.

Here, the detection information acquirer 73 of the server SV stores the attack detection information AK1 as the acquired detection information AK1.

If the acquired detection information AK1 is "firmware falsification detection" as shown in FIG. 10, discarding of the transmitted/received packets to/from MFP01 is started at step b11.

In other words, it is preferable to discard the received packets which will be transmitted from MFP01 in the future, because they may be packets sent by an unauthorized attack, and it is also preferable to discard the packets transmitted to MFP01 via a network such as the Internet without transmitting them to MFP01, because they may be unauthorized data transmitted from the attack executing device 5. Therefore, the communication made to MFP01 is blocked.

Next, attack countermeasure instruction information TS2, which is to be transmitted to another image forming apparatus MFP02 instead of MFP01 which transmitted the attack detection information AK1, is generated by using the attack countermeasure function MF of another image forming apparatus MFP02.

The another image forming apparatus MFP02 is, for example, an image forming apparatus connected to the same LAN as the segment to which MFP01 is connected.

At step b4, the countermeasure instruction information generator 75 generates the attack countermeasure instruction information TS2 for the MFP02 from the acquired detection information AK1 and the attack countermeasure function MF of the MFP02 stored in the storage 70, using the attack countermeasure information KT.

At step b5, the countermeasure instruction information generator 75 further transmits the generated attack countermeasure instruction information TS2 to the MFP02.

At step c1, the countermeasure instruction information acquirer 23 of the MFP02 receives the attack countermeasure instruction information TS2 and stores it as the acquired countermeasure instruction information TS2.

At step c2, the attack countermeasure determiner 24 analyzes the received attack countermeasure instruction information TS2, decides an attack countermeasure method to be executed, and on the basis of the received attack countermeasure instruction information TS2, the attack countermeasure executor 25 executes the decided attack countermeasure method.

As described above, when the acquired detection information AK1 is "firmware falsification detection", since MFP01 which detected the firmware falsification may give the attack to other image forming apparatuses, the acquired countermeasure instruction information corresponding to the attack detection information AK1 detected in MFP01 is transmitted to the image forming apparatus MFP02 other than MFP01 belonging to the LAN of the same segment, and the measures against the attack are taken in the image forming apparatus other than MFP01.

This allows rapid and appropriate measures to be taken to prevent unauthorized attacks in the image forming apparatus MFP02, which has not yet had measures against unauthorized attacks of firmware falsification.

Embodiment 3

Figure 12:
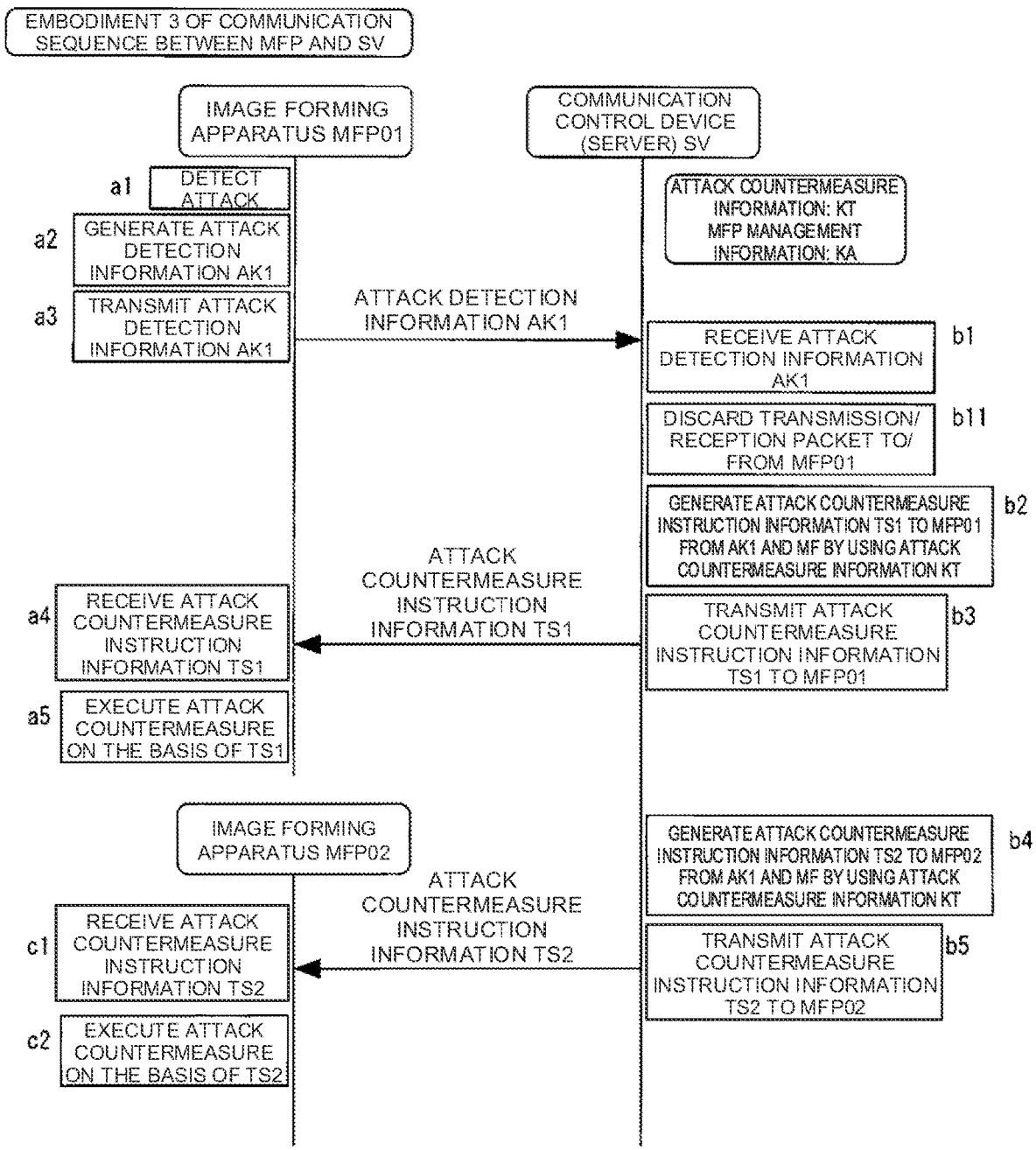
FIG. 12 A communication sequence diagram of an embodiment 3 for attack detection and attack countermeasure instruction performed between the image forming apparatus and the server of the present invention.

FIG. 12 shows a communication sequence diagram of Embodiment 3 for the attack detection and attack countermeasure instruction performed between the image forming apparatus and the server.

Here, it is assumed that the same attack countermeasure information as shown in FIG. 8 above is used.

In addition, it is assumed that the attack countermeasure instruction is given to MFP01 which detected the unauthorized attack and another image forming apparatus MFP02 as in FIG. 9, and the transmission/reception packets to/from MFP01 which detected the unauthorized attack are discarded in the server SV as in FIG. 11.

First, suppose that at step a1 of MFP01, the attack detector 21 detects an attack.

Next, at step a2, the detected attack is analyzed, and attack detection information AK1 is generated. For example, the attack detection information as shown in FIG. 4 is generated. At step a3, the detection information notifier 22 transmits the generated attack detection information AK1 to the server SV.

On the other hand, at step b1 of the server SV, the attack detection information AK1 is received.

Here, the detection information acquirer 73 of the server SV stores the attack detection information AK1 as the acquired detection information AK1.

If the acquired detection information AK1 is the information detected by MFP01 and transmitted from MFP01, there is a possibility that unauthorized attacks may be continuously performed against MFP01 via the network 4. Therefore, at step b11, discarding of the transmission/reception packets to/from MFP01 is started.

In other words, it is preferable to discard the received packets which will be transmitted from MFP01 in the future, because they may be packets sent by an unauthorized attack, and it is also preferable to discard the packets transmitted to MFP01 via a network such as the Internet without transmitting them to MFP01, because they may be unauthorized data transmitted from the attack executing device 5. Therefore, the communication made to MFP01 is blocked.

At step b2, the countermeasure instruction information generator 75 generates the attack countermeasure instruction information TS1 for the MFP01 from the acquired detection information AK1 and the attack countermeasure function MF of the MFP01 stored in the storage 70, using the attack countermeasure information KT.

At step b3, the countermeasure instruction information generator 75 further transmits the generated attack countermeasure instruction information TS1 to the MFP01.

At step a4, the countermeasure instruction information acquirer 23 of the MFP01 receives the attack countermeasure instruction information TS1 and stores it as the acquired countermeasure instruction information TS1.

At step a5, the attack countermeasure determiner 24 analyzes the received attack countermeasure instruction information TS1, decides an attack countermeasure method to be executed, and on the basis of the received attack countermeasure instruction information TS1, the attack countermeasure executor 25 executes the decided attack countermeasure method.

In addition, if another image forming apparatus MFP02 other than MFP01 is connected to the same LAN as the segment to which MFP01 is connected, the attack countermeasure instruction information is also transmitted to this image forming apparatus MFP02. However, unlike the attack countermeasure instruction information TS1 transmitted to MFP01, the attack countermeasure instruction information TS2 for MFP02 is generated from the acquired detection information AK1 and the attack countermeasure function MF of MFP02 stored in the storage 70.

That is, at step b4 of the server SV, the countermeasure instruction information generator 75 generates the attack countermeasure instruction information TS2 for the MFP 02 from the acquired detection information AK1 and the attack countermeasure function MF of the MFP02 stored in the storage 70, using the attack countermeasure information KT.

At step b5, the countermeasure instruction information generator 75 transmits the generated attack countermeasure instruction information TS2 to the MFP02.

At step c1 of MFP02, the countermeasure instruction information acquirer 23 of MFP02 receives the attack countermeasure instruction information TS2 and stores it as the acquired countermeasure instruction information TS2.

At step c2 of MFP02, the attack countermeasure determiner 24 of MFP02 analyzes the received attack countermeasure instruction information TS2, decides an attack countermeasure method to be executed, and on the basis of the received attack countermeasure instruction information TS2, the attack countermeasure executor 25 executes the decided attack countermeasure method.

As described above, the acquired countermeasure instruction information corresponding to the attack detection information AK1 detected in MFP01 is transmitted to the two image forming apparatuses (MFP01 and MFP02) belonging to the LAN of the same segment, and the measures to deal with the attack are taken in the both image forming apparatuses.

In addition to the attack detection information AK1, the attack countermeasure instruction information TS is generated by considering the attack countermeasure function MF of each image forming apparatus MFP and sent to the corresponding image forming apparatuses (MFP01 and MFP02), respectively, so that each image forming apparatus MFP can take an appropriate response to an unauthorized attack.

Furthermore, since the transmitted/received packets to the MFP01 from the network 4 such as the Internet are discarded in the server SV, unauthorized attacks made against the MFP01 can be prevented in the future.

Embodiment 4

FIG. 13 shows an explanatory view of an embodiment of the attack countermeasure information stored in the storage of the communication control device.

Figure 14:
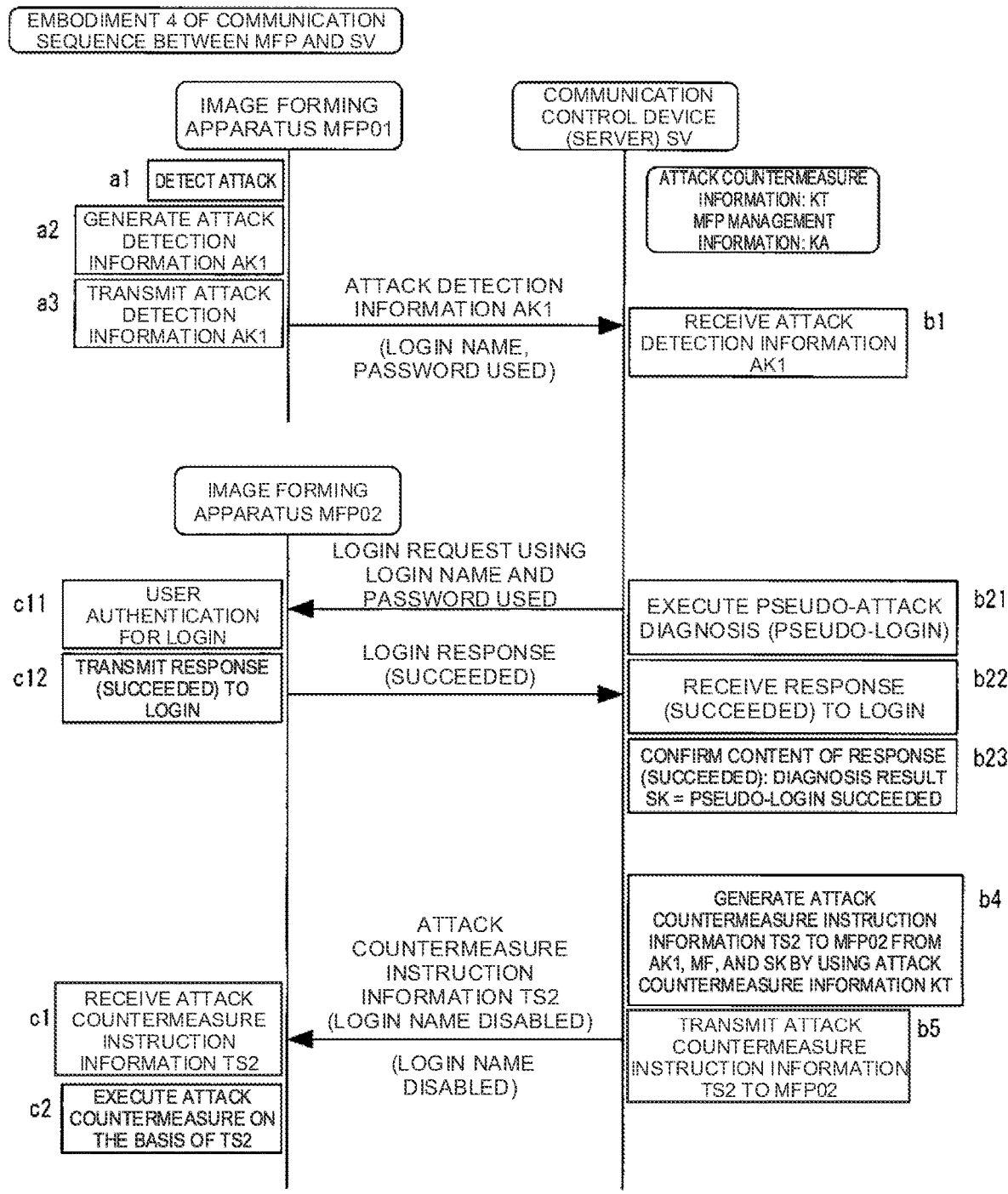
FIG. 14 A communication sequence diagram of an embodiment 4 for attack detection and attack countermeasure instruction performed between the image forming apparatus and the server of the present invention.

FIG. 14 shows a communication sequence diagram of Embodiment 4 for the attack detection and attack countermeasure instruction performed between the image forming apparatus and the server.

Here, a case in which a pseudo-attack diagnosis is performed on an image forming apparatus other than the image forming apparatus MFP01 which detected an unauthorized attack, and an attack countermeasure instruction is given to an image forming apparatus which might be subjected the same unauthorized attack or an image forming apparatus that has not taken measures against the unauthorized attack will be described.

The attack countermeasure information KT shown in FIG. 13 is stored in association with the attack detection content KK, the attack countermeasure function MF, the pseudo-attack diagnosis SD, and the attack countermeasure instruction TSH.

In addition, FIG. 13 also shows the "execution content of the attack countermeasure", which is the operation of the MFP corresponding to the attack countermeasure instruction TSH.

A pseudo-attack diagnosis SD is information that sets the attack content to be pseudo-executed and the diagnosis results when the pseudo-attack is performed.

In FIG. 13, two examples of attack countermeasure information are shown.

Here, it is assumed that the attack detection content KK has one attack detection content, and the attack countermeasure function MF has two types of MFP control functions.

The attack detection content KK41 is information which means that an unauthorized login from an external network was detected similarly to KK01 above, and corresponds to a case where an unauthorized login to the image forming apparatus MFP was detected from the LAN of the segment to which the computers belonging to outside of the company are connected, not from the LAN of the segment to which the computers in the company are connected.

The attack countermeasure function MF41 is a function to disable the login name, which means that the MFP has a function to prevent accepting of logins using this login name.

As described below, when it is already known that the login name is an unauthorized one, if a pseudo-login is performed for a certain image forming apparatus MFP02 with that login name and the login is successful, there is a possibility of being subjected to an unauthorized attack, so that MFP02 then disables the login name which could perform pseudo-login.

The attack countermeasure function MF42 is a login control function for each segment similarly to MF01 described above, which means that the MFP has the login control function and controls whether to permit or to prohibit a login to the image forming apparatus for each segment.

The pseudo-attack diagnosis SD41 is the information that sets the attack content and the diagnosis result in the case where the pseudo-attack is performed, and here, the attack content is "pseudo-login with login name and password used for unauthorized login" and the diagnosis result is "pseudo-login succeeded".

In the attack countermeasure information KT shown in FIG. 13, the attack detection content KK, the attack countermeasure function MF, the pseudo-attack diagnosis SD, and the attack countermeasure instruction TSH are stored in association, so that when the three conditions, that is, the corresponding attack detection content KK, the attack countermeasure function MF, and the pseudo-attack diagnosis SD are satisfied, the attack countermeasure instruction TSH associated with them is selected, and the attack countermeasure instruction information TS is generated.

For example, if the attack detection content KK41, the attack countermeasure function MF41, and the pseudo-attack diagnosis SD41 in FIG. 13 are satisfied, the attack countermeasure instruction TS41 associated with these pieces of information (KK41, MF41, SD41) is selected.

Suppose that the attack countermeasure instruction TS41 is set to "Disable login name that succeeded in pseudo-login". When the attack countermeasure instruction TS41 is selected, as shown in "Operation of MFP" on the right side thereof, the MFP executes the operation of "prohibit login using login name that succeeded in pseudo-login for certain period of time" (CT41).

In addition, when the attack detection content KK41, the attack countermeasure function MF42, and the pseudo-attack diagnosis SD41 in FIG. 13 are satisfied, the attack countermeasure instruction TS42 associated with these pieces of information (KK41, MF42, SD41) is selected.

Suppose that "suspend login from external segment" is set in the attack countermeasure instruction TS42.

When the attack countermeasure instruction TS42 is selected, as shown in "operation of MFP" on the right side thereof, the MFP executes the operation of "prohibit login from external segment for certain period of time" (CT42).

Next, using the communication sequence diagram of Embodiment 4 shown in FIG. 14, the processing of attack detection and attack countermeasure instruction of Embodiment 4 executed between the image forming apparatus MFP and the server SV will be described.

First, suppose that at step a1 of MFP01, the attack detector 21 detects an attack.

Next, at step a2, the detected attack is analyzed, and attack detection information AK1 is generated. For example, the attack detection information as shown in FIG. 4 is generated. At step a3, the detection information notifier 22 transmits the generated attack detection information AK1 to the server SV. If the detected unauthorized attack is an unauthorized login, the transmitted attack detection information AK1 includes the login name used and the login password used as shown in FIG. 4.

On the other hand, at step b1 of the server SV, the attack detection information AK1 is received.

Here, the detection information acquirer 73 of the server SV stores the attack detection information AK1 as the acquired detection information AK1. Since the acquired detection information AK1 contains the login name used and login password used as shown in FIG. 4, the login name used and the login password used are used for pseudo-attack diagnosis.

Next, the server SV performs a pseudo-attack diagnosis at step b21.

For example, as described above, if the attack detection information AK1 is related to an unauthorized login, a pseudo-login is performed using the login name used and password.

The pseudo-attack diagnosis is performed on the image forming apparatus other than MFP01 which transmitted the attack detection information AK1. That is, a login request including the login name used and password is transmitted to the image forming apparatus MFP02.

At step c11 of the image forming apparatus MFP02, the login request is received and user authentication is performed.

In the user authentication, it is checked whether or not the combination of the login name used and the password included in the login request is the one registered in the user information stored in advance.

If the combination is registered in the user information, the user authentication succeeds, but if not, the user authentication fails.

At step c12, the MFP02 transmits a response to the login request, that is, a result (success or failure) of the user authentication to the server SV.

Here, suppose that the user authentication succeeded and the information indicating the success is transmitted to the server SV as a response to the login request.

At step b22, the server SV receives the response (success) to the login request.

At step b23, the content of the received response is confirmed. If the content of the received response is "succeeded", the login name used and password and the information indicating that "the pseudo-login succeeded" are stored in the diagnosis result information SK as the diagnosis result.

In addition, the diagnosis result information SK generally stores the diagnosis item and the diagnosis result as shown in FIG. 6. The diagnosis item corresponds to the pseudo executed attack content, and the diagnosis result corresponds to the response to the attack.

The "pseudo-login succeeded" means that a login with the login name and password used in the unauthorized attack can be made to MFP02, and that MFP02 might be also subjected to an unauthorized attack similarly to MFP01 in the future.

Therefore, it is preferable that, in order to prevent an unauthorized attack which could occur in MFP02 in the future, a login using the login name and password used in the unauthorized attack should be prohibited.

On the other hand, if the content of the received response was confirmed, and the pseudo-login "failed", it means that a login with the login name and password used in the unauthorized attack could not be made to MFP02, and it can be determined that MFP02 might not be subjected to the unauthorized attack similarly to MFP01. Therefore, if the pseudo-login failed, there is no need to execute the following processing.

At step b4 of the server SV, the countermeasure instruction information generator 75 generates the attack countermeasure instruction information TS2 for the MFP02 from the acquired detection information AK1, the attack countermeasure function MF of the MFP02 and the diagnosis result information SK stored in the storage 70, using the attack countermeasure information KT.

The attack countermeasure information KT used here is information including the pseudo-attack diagnosis SD as shown in FIG. 13.

For example, when the acquired detection information AK1 corresponds to KK41 in FIG. 13, the MFP02 has the attack countermeasure function MF41 in FIG. 13, and the diagnosis result information SK corresponds to SD41 in FIG. 13, TS41 in FIG. 13 is selected, and the information corresponding to TS41 is generated as the attack countermeasure instruction information TS2 for the MFP02.

At step b5, the countermeasure instruction information generator 75 transmits the generated attack countermeasure instruction information TS2 to the MFP02.

For example, information requesting "disabling of login name which succeeded in pseudo-login" is transmitted.

At step c1 of MFP02, the countermeasure instruction information acquirer 23 of MFP02 receives the attack countermeasure instruction information TS2 and stores it as the acquired countermeasure instruction information TS2.

At step c2 of MFP02, the attack countermeasure determiner 24 of MFP02 analyzes the received attack countermeasure instruction information TS2, decides an attack countermeasure method to be executed, and on the basis of the received attack countermeasure instruction information TS2, the attack countermeasure executor 25 executes the decided attack countermeasure method.

In MFP02, the processing of disabling the login name which succeeded in the pseudo-login is executed, for example, and even if a login request is made with a login name which succeeded in pseudo-login in the future, the login request will be ignored.

In the above explanation, the pseudo-attack diagnosis was performed on the image forming apparatus MFP02 other than the image forming apparatus MFP01 which detected the attack, but this is not limited thereto.

If there are a plurality of image forming apparatuses other than the image forming apparatus MFP01 which detected the attack, the similar pseudo-attack diagnosis is performed for all of the plurality of image forming apparatuses.

Then, as the result of performance of the pseudo-attack diagnosis, the server SV generates the attack countermeasure instruction information TS corresponding to the image forming apparatus MFP that succeeded in the pseudo-login, transmits the attack countermeasure instruction information TS to the image forming apparatus that succeeded in the pseudo-login, and in the image forming apparatus MFP that succeeded in the pseudo-login, processing of disabling the login name that succeeded in the pseudo-login is executed.

As described above, a pseudo-attack diagnosis is performed on the image forming apparatus MFP02 not having been subjected to an attack yet and which is an image forming apparatus other than the image forming apparatus MFP01 that detected the attack, and the attack countermeasure instruction information TS is transmitted to the image forming apparatus MFP02 which responds in such a way as to accept the pseudo-attack, such as the successful pseudo-login, and countermeasures are taken to prevent the image forming apparatus MFP02 from being subjected to the same attack as the detected attack.

For an image forming apparatus MFP which responds in such a way as not to be subjected to the pseudo-attack, such as failing in a pseudo-login, the attack countermeasure instruction information TS is not transmitted, and no countermeasures are taken against the attack.

According to this, countermeasures against the detected attack are taken only for the image forming apparatuses that may be subjected to the unauthorized attack among the image forming apparatuses MFPs that have not been subjected to an attack yet, and countermeasures against the attack are not taken for the image forming apparatuses that may not be subjected to the unauthorized attack and thus, unnecessary data communication can be reduced, and appropriate measures can be taken promptly for each image forming apparatus.

Embodiment 5

FIG. 15 shows an explanatory view of an embodiment of the attack countermeasure information stored in the storage of the communication control device.

Figure 16:
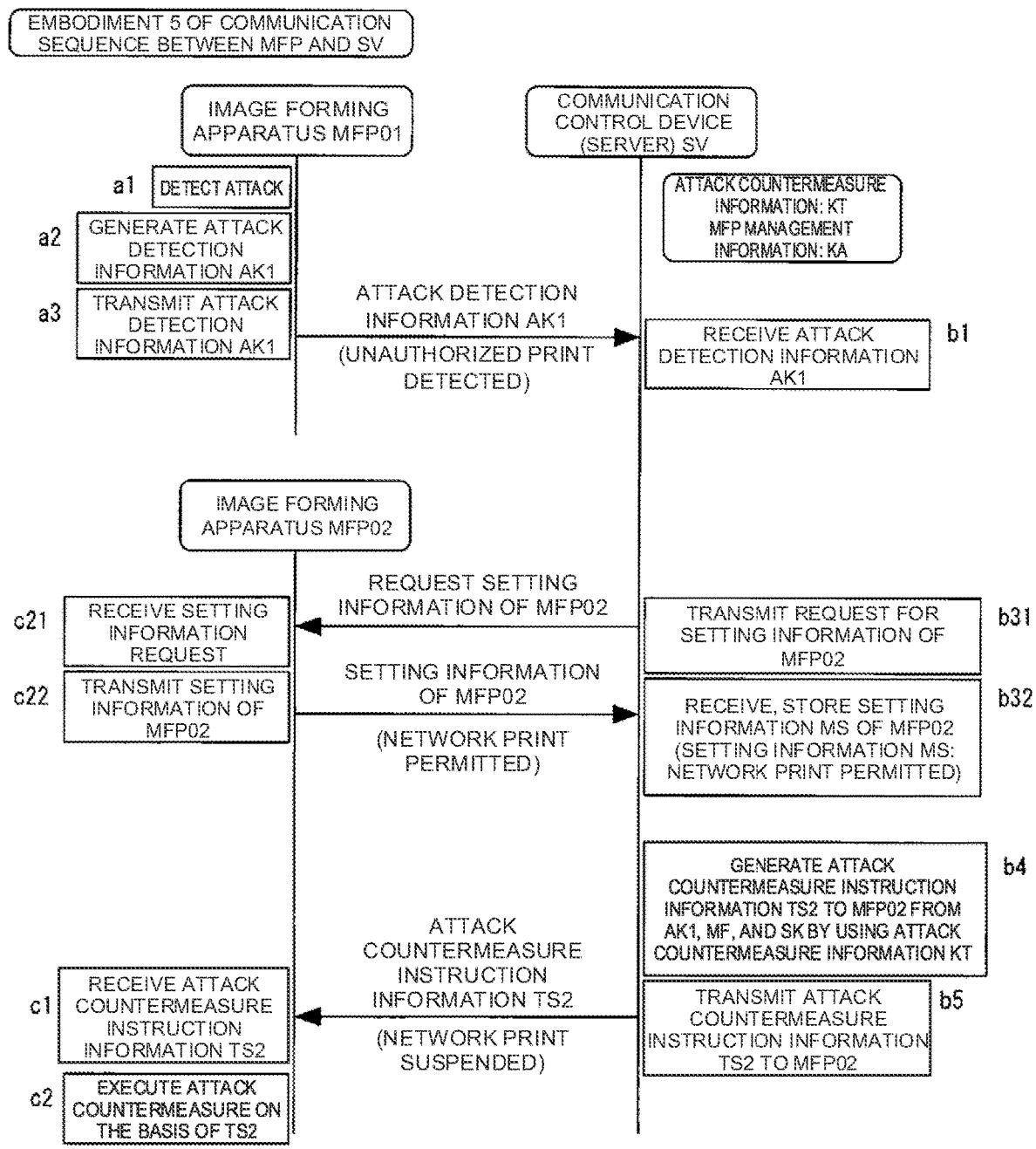
FIG. 16 A communication sequence diagram of an embodiment 5 for attack detection and attack countermeasure instruction performed between the image forming apparatus and the server of the present invention.

FIG. 16 shows a communication sequence diagram of Embodiment 5 for the attack detection and attack countermeasure instruction performed between the image forming apparatus and the server.

Here, a case in which, before an attack countermeasure instruction is given to the image forming apparatus MFP02 other than the image forming apparatus MFP01 which detected the unauthorized attack, the current setting information of the image forming apparatus MFP02 is requested from the image forming apparatus MFP02, the attack countermeasure instruction information TS is generated from the attack detection content KK, the attack countermeasure function MF of the MFP02, and the attack countermeasure instruction TSH corresponding to the acquired setting information MS acquired from the MFP02 and then, the attack countermeasure instruction is given to the image forming apparatus MFP02 will be described.

The attack countermeasure information KT shown in FIG. 15 is stored in association with the attack detection content KK, the attack countermeasure function MF, the MFP setting information SE, and the attack countermeasure instruction TSH.

In addition, FIG. 15 also shows the "execution content of the attack countermeasure", which is the operation of the MFP corresponding to the attack countermeasure instruction TSH.

The MFP setting information SE is information that indicates the content of the setting information required for the MFP as a condition for giving an attack countermeasure instruction, and is compared with the acquired setting information MS acquired from the image forming apparatus MFP.

In FIG. 15, two examples of the attack countermeasure information are shown.

Here, it is assumed that the attack detection content KK has one attack detection content, the attack countermeasure function MF has two types of MFP control functions, and the MFP setting information SE has two types of MFP setting information.

The attack detection content KK51 is information which means that unauthorized print from an external network was detected similarly to KK03 described above, which corresponds to the case where an unauthorized print instruction to the image forming apparatus MFP was detected from the LAN of the segment to which the computers belonging to outside of the company are connected, not from the LAN of the segment to which the computers in the company are connected.

The attack countermeasure function MF51 is a print control function for each segment, which means that the MFP has a print control function.

The print control function for each segment is a function to give a print instruction to the image forming apparatus from a computer connected to the LAN of one segment, and to control whether the print instruction is permitted or prohibited for each segment.

The attack countermeasure function MF52 is a print control function via a network, which means that the MFP has a print control function via a network such as the Internet.

MFPs with this function control whether to permit or prohibit print instructions via a network such as the Internet.

The MFP setting information SE51 is that the content of the setting information required for the MFP as a condition for giving an attack countermeasure instruction is that "setting of print from external segment permitted or not should be print permitted".

If, among the setting items of MFP02, the setting of print from external segment permitted or not is set to "print permitted", when a print instruction from the external segment is given, even if the print instruction is an unauthorized attack, unauthorized print will be performed in MFP02.

Thus, when the setting of print from external segment permitted or not is set to "print permitted", an attack countermeasure instruction not to perform the print is given to MFP02.

On the other hand, if the setting of print from external segment permitted or not is set to print prohibited, even if there is an unauthorized print instruction from the external segment, the print will not be performed and there is no need to give an attack countermeasure instruction.

The MFP setting information SE52 is that the content of the setting information required for the MFP as a condition for giving an attack countermeasure instruction is that "setting of print via network permitted or not should be print permitted".

In this case, too, when the setting of print via network permitted or not among the setting items of MFP02 is set to "print permitted", if a print instruction via a network is given, even if the print instruction is an unauthorized attack, unauthorized print will be performed by MFP02.

Thus, when the setting of print via network permitted or not is set to "print permitted", an attack countermeasure instruction not to perform the print is given to MFP02.

In the attack countermeasure information KT shown in FIG. 15, the attack detection content KK, the attack countermeasure function MF, the MFP setting information SE, and the attack countermeasure instruction TSH are stored in association, so that when the three conditions of the corresponding attack detection content KK, the attack countermeasure function MF, and the MFP setting information SE are satisfied, the attack countermeasure instruction TSH associated with them is selected, and the attack countermeasure instruction information TS is generated.

For example, when the attack detection content KK51, the attack countermeasure function MF51, and the MFP setting information SE51 in FIG. 15 are satisfied, the attack countermeasure instruction TS51 associated with these pieces of information (KK51, MF51, SE51) is selected.

Suppose that "suspend print from external segment" is set in the attack countermeasure instruction TS51.

When the attack countermeasure instruction TS51 is selected, the MFP executes the operation of "prohibit print from external segment for certain period of time" (CT51), as shown in "operation of MFP" on the right side thereof.

In addition, when the attack detection content KK51, the attack countermeasure function MF52, and the MFP setting information SE52 in FIG. 15 are satisfied, the attack countermeasure instruction TS52 associated with these pieces of information (KK51, MF52, SE52) is selected.

Suppose that "suspend print via network" is set in the attack countermeasure instruction TS52.

When the attack countermeasure instruction TS52 is selected, the MFP executes the operation "prohibit print via network for certain period of time" as shown in "Operation of MFP" on the right side thereof (CT52).

Next, using the communication sequence diagram of Embodiment 5 shown in FIG. 16, the processing of attack detection and attack countermeasure instructions of Embodiment 5 executed between the image forming apparatus MFP and the server SV will be described.

First, suppose that at step a1 of MFP01, the attack detector 21 detects an attack.

Next, at step a2, the detected attack is analyzed, and attack detection information AK1 is generated. For example, the attack detection information as shown in FIG. 4 is generated. At step a3, the detection information notifier 22 transmits the generated attack detection information AK1 to the server SV. When the detected unauthorized attack is unauthorized print via a network, the transmitted attack detection information AK1 includes information indicating that the unauthorized print via a network has been detected.

On the other hand, at step b1 of the server SV, the attack detection information AK1 is received.

Here, the detection information acquirer 73 of the server SV stores the attack detection information AK1 as the acquired detection information AK1.

At step b31 of the server SV, data requesting the setting information currently set in MFP02 is transmitted to the image forming apparatus MFP02 other than MFP01 which detected the unauthorized attack.

At step c21 of the image forming apparatus MFP02, the setting information request for MFP02 is received.

At step c22, the MFP02 reads out the MFP setting information MS stored in the own storage 30 and transmits it to the server SV.

It is assumed that the MFP setting information MS includes, for example, the information "print via network permitted".

At step b32, the MFP setting information MS is received and stored as the acquired setting information MS.

At step b4 of the server SV, the countermeasure instruction information generator 75 generates the attack countermeasure instruction information TS2 for the MFP02 from the acquired detection information AK1, the attack countermeasure function MF of the MFP02 stored in the storage 70, and the acquired setting information MS, using the attack countermeasure information KT.

The attack countermeasure information KT used here is information including the MFP setting information SE, as shown in FIG. 15.

For example, when the acquired detection information AK1 corresponds to KK51 in FIG. 13, the MFP02 includes the attack countermeasure function MF52 in FIG. 15, and the acquired setting information MS matches the MFP setting information SE52, TS52 in FIG. 15 is selected, and information corresponding to TS52 is generated as the attack countermeasure instruction information TS2 for the MFP02.

However, if the MFP setting information SE that matches the acquired setting information MS is not in the attack countermeasure information KT, the attack countermeasure instruction is not selected, and the attack countermeasure instruction for MFP02 is not given.

For example, when the acquired setting information MS is "Prohibit print via network", no attack countermeasure instruction is given to MFP02 because there is no MFP setting information SE that matches this acquired setting information MS in the attack countermeasure information KT in FIG. 15.

At step b5, the countermeasure instruction information generator 75 transmits the generated attack countermeasure instruction information TS2 to the MFP02.

For example, information requesting "suspend print via network" is transmitted.

At step c1 of MFP02, the countermeasure instruction information acquirer 23 of MFP02 receives the attack countermeasure instruction information TS2 and stores it as the acquired countermeasure instruction information TS2.

At step c2 of MFP02, the attack countermeasure determiner 24 of MFP02 analyzes the received attack countermeasure instruction information TS2, decides an attack countermeasure method to be executed, and on the basis of the received attack countermeasure instruction information TS2, the attack countermeasure executor 25 executes the decided attack countermeasure method.

In MFP02, for example, processing for prohibiting print via a network for a certain period of time is executed, and in the future, such countermeasure will be taken that any print request via the network is ignored within a certain period of time.

In the above description, the setting information is requested from the image forming apparatus MFP02 other than the image forming apparatus MFP01 which detected the attack, but this is not limited thereto. If there are a plurality of image forming apparatuses other than the image forming apparatus MFP01 which detected the attack, it is only necessary that the setting information of the plurality of image forming apparatuses is requested similarly from all of the plurality of image forming apparatuses, and for each of the plurality of image forming apparatuses, whether or not to give the attack countermeasure instruction is determined by using the acquired setting information MS, and if the attack countermeasure instruction should be given, individual attack countermeasure instruction information is generated for each of the plurality of image forming apparatuses so as to execute the attack countermeasure instructions.

As described above, when the attack countermeasure instruction is given to the image forming apparatus MFP02 not having been subjected to an attack yet and which is an image forming apparatus other than the image forming apparatus MFP01 that detected the attack, the current setting information MS of MFP02 is acquired from the MFP02, and the attack countermeasure instruction is decided by considering the acquired setting information MS in addition to the attack countermeasure function MF of MFP02.

According to this, an attack countermeasure instruction suitable for the functions and current setting contents of an image forming apparatus MFP that has not been subjected to an attack yet can be given to that image forming apparatus MFP individually.

In addition, even for an image forming apparatus MFP that has not been subjected to an attack yet, because an attack countermeasure instruction is selected correspondingly to the current setting information MS, countermeasures against the detected attack are taken only when there is a possibility of being subjected to an unauthorized attack judging from the current setting contents, and countermeasures against the attack are not taken when there is no possibility of being subjected to an unauthorized attack and thus, unnecessary data communication can be reduced, and an appropriate response can be taken promptly for each image forming apparatus.

What is claimed is:

1. A communication control system including an information processing apparatus and a communication control device connected to each other through a network, wherein the information processing apparatus includes:
   an attack detector that detects an unauthorized attack;
   a detection information notifier that transmits attack detection information concerning the detected unauthorized attack to the communication control device;
   a countermeasure instruction information acquirer that acquires attack countermeasure instruction information transmitted from the communication control device;
   a countermeasure instruction determiner that determines a countermeasure method to be executed against the detected unauthorized attack based on the acquired attack countermeasure instruction information; and
   an attack countermeasure executor that executes the determined countermeasure method against the detected unauthorized attack; and
the communication control device includes:
   a detection information acquirer that acquires the attack detection information transmitted from the information processing apparatus;
   a storage that stores, in advance attack countermeasure information including:
      an attack detection content concerning a predicted attack,
      an attack countermeasure function which is a function held by the information processing apparatus in order to deal with the predicted attack, and
      an attack countermeasure instruction associated with the attack detection content and the attack countermeasure function and indicating a countermeasure method to be executed against the predicted attack of the attack detection content;
   an attack countermeasure decider that selects the attack countermeasure instruction associated with the attack detection content that matches the attack detection information and the attack countermeasure function for the information processing apparatus which transmitted the attack detection information by using the transmitted attack detection information and the attack countermeasure information and determines the countermeasure method to be executed against the detected unauthorized attack; and
   a countermeasure instruction information generator that generates the attack countermeasure instruction information including the determined countermeasure method and transmits the attack countermeasure instruction information to the information processing apparatus, wherein
   when the information processing apparatus acquires the attack countermeasure instruction information, the determined countermeasure method against the detected unauthorized attack that is indicated in the acquired attack countermeasure instruction information is executed.

2. The communication control system according to claim 1, wherein when a plurality of information processing apparatuses, including the information processing apparatus, and the communication control device are connected via the network, the attack countermeasure function included in the attack countermeasure information is stored for each of the plurality of information processing apparatuses,
   the attack countermeasure decider selects the attack countermeasure instruction associated with the attack detection content that matches the attack detection information and the attack countermeasure function fora second information processing apparatus other than a the information processing apparatus which transmitted the attack detection information by using the transmitted attack detection information and the attack countermeasure information and determines the countermeasure method to be executed against the detected unauthorized attack in the second information processing apparatus, and the countermeasure instruction information generator generates second attack countermeasure instruction information including the determined countermeasure method and transmits the second attack countermeasure instruction information to the second information processing apparatus which transmitted the attack detection information.

3. The communication control system according to claim 2, wherein when the second attack countermeasure instruction information transmitted to the second information processing apparatus further includes the determined countermeasure method against the detected unauthorized attack indicating that a communication with the information processing apparatus which transmitted the attack detection information should be blocked, and
the attack countermeasure executor of the second information processing apparatus blocks the communication between the second information processing apparatus and the information processing apparatus.

4. The communication control system according to claim 1, wherein the communication control device further includes a communication blocking controller that blocks a communication with a predetermined information processing apparatus, and
when the detection information acquirer acquires the attack detection information transmitted from the information processing apparatus, the communication blocking controller blocks a communication with the information processing apparatus which transmitted the attack detection information.

5. The communication control system according to claim 1, wherein the communication control device further includes a pseudo-attack diagnosis section that performs a diagnosis on the detected unauthorized attack by pseudo-executing an attack similar to the detected unauthorized attack detected in the information processing apparatus to a second information processing apparatus other than the information processing apparatus which detected the unauthorized attack,
the attack countermeasure information further includes a pseudo-attack diagnosis in which a pseudo-executed attack content and a diagnosis result in the case of the attack are set in advance, and the attack countermeasure information including the attack countermeasure instruction associated with the attack detection content, the attack countermeasure function, and the pseudo-attack diagnosis and indicating the countermeasure method to be executed against the predicted attack of the attack detection content is stored in advance,
after the attack detection information is acquired from the information processing apparatus which detected the unauthorized attack, the pseudo-attack diagnosis section performs the diagnosis by pseudo-executing the attack similar to the detected unauthorized attack against the second information processing apparatus,
the attack countermeasure decider selects the attack countermeasure instruction associated with the attack detection content that matches the attack detection information, the attack countermeasure function for the second information processing apparatus, and the pseudo-attack diagnosis that matches the diagnosis generated by the pseudo-attack diagnosis section by using the attack detection information acquired from the information processing apparatus and the attack countermeasure information and determines the countermeasure method to be executed against the detected unauthorized attack, and
the countermeasure instruction information generator generates second attack countermeasure instruction information including the determined countermeasure method and transmits the second attack countermeasure instruction information to the second information processing apparatus.

6. The communication control system according to claim 1, wherein the communication control device further includes an apparatus information acquirer that acquires setting information concerning the information processing apparatus,
the attack countermeasure information further includes apparatus setting information that indicates, in advance, a setting content required for the information processing apparatus, and the attack countermeasure information including the attack countermeasure instruction associated with the attack detection content, the attack countermeasure function, and the apparatus setting information and indicating the countermeasure method to be executed against the predicted attack of the attack detection content is stored in advance,
after the attack detection information is acquired from the information processing apparatus which detected the unauthorized attack, the apparatus information acquirer acquires the setting information currently set in a second information processing apparatus from the second information processing apparatus other than the information processing apparatus which detected the unauthorized attack,
the attack countermeasure decider selects the attack countermeasure instruction associated with the attack detection content that matches the attack detection information, an attack countermeasure function for the second information processing apparatus, and apparatus setting information that matches the acquired setting information currently set in the second information processing apparatus by using the attack detection information acquired from the information processing apparatus and the attack countermeasure information and determines the countermeasure method to be executed against the detected unauthorized attack, and
the countermeasure instruction information generator generates second attack countermeasure instruction information including the determined countermeasure method and transmits the second attack countermeasure instruction information to the second information processing apparatus.

7. The communication control system according to claim 1, wherein the communication control device is a server that manages a communication to the information processing apparatus, or a router that monitors data sent to or received from an external network to the information processing apparatus.

8. An information processing apparatus connected to a communication control device via a network, comprising:
an attack detector that detects an unauthorized attack;
a detection information notifier that transmits attack detection information concerning the detected unauthorized attack to the communication control device;
a countermeasure instruction information acquirer that acquires attack countermeasure instruction information transmitted from the communication control device;
a countermeasure instruction determiner that determines a countermeasure method to be executed against the detected unauthorized attack from the acquired attack countermeasure instruction information; and an attack countermeasure executor that executes the determined countermeasure method against the detected unauthorized attack, wherein after the attack detector detects the unauthorized attack, the detection information notifier transmits the attack detection information concerning the detected unauthorized attack to the communication control device, when the attack countermeasure instruction information including the countermeasure method against the detected unauthorized attack determined from an attack countermeasure instruction associated with the attack detection information and an attack countermeasure function for the information processing apparatus which transmitted the attack detection information stored in advance, in the communication control device is transmitted from the communication control device, the countermeasure instruction information acquirer acquires the transmitted attack countermeasure instruction information, and when the information processing apparatus acquires the attack countermeasure instruction information, the determined countermeasure method against the detected unauthorized attack indicated in the acquired attack countermeasure instruction information is executed.

9. A communication control method of a communication control system in which an information processing apparatus and a communication control device are connected to each other through a network, the communication control method comprising:

detecting, by the information processing apparatus, an unauthorized attack;

transmitting attack detection information concerning the detected unauthorized attack from the information processing apparatus to the communication control device;

storing attack countermeasure information, in advance, in the communication control device and the attack countermeasure information includes an attack detection content concerning a predicted attack, an attack countermeasure function which is a function held by the information processing apparatus in order to deal with the predicted attack, and an attack countermeasure instruction associated with the attack detection content and the attack countermeasure function and indicating a countermeasure method to be executed against the predicted attack of the attack detection content;

selecting the attack countermeasure instruction associated with the attack detection content that matches the attack detection information and the attack countermeasure function for the information processing apparatus which transmitted the attack detection information and determining a countermeasure method to be executed against the detected unauthorized attack by the communication control device;

generating attack countermeasure instruction information including the determined countermeasure method and transmitting the attack countermeasure instruction information to the information processing apparatus by the communication control device;

acquiring the attack countermeasure instruction information transmitted from the communication control device by the information processing apparatus;

determining the countermeasure method to be executed against the detected unauthorized attack from the acquired attack countermeasure instruction information by the information processing apparatus; and executing the determined countermeasure method against the detected unauthorized attack by the information processing apparatus.

* * * * *